US012640368B2

(12) United States Patent
Laurent et al.

(10) Patent No.: US 12,640,368 B2
(45) Date of Patent: May 26, 2026

(54) CATHODE MATERIAL AND METHODS OF FORMING

(71) Applicant: SAINT-GOBAIN CERAMICS & PLASTICS, INC., Worcester, MA (US)

(72) Inventors: Morgane A. S. Laurent, Clinton, MA (US); Alireza Shirazi-Amin, Berlin, MA (US); Yuto Takagi, Natick, MA (US); Choung-Houng Lai, Acton, MA (US); Kapsoo Cheon, Marlborough, MA (US)

(73) Assignee: SAINT-GOBAIN CERAMICS & PLASTICS, INC., Northborough, MA (US)

( * ) Notice: Subject to any disclaimer, the term of this patent is extended or adjusted under 35 U.S.C. 154(b) by 0 days.

(21) Appl. No.: 18/398,983

(22) Filed: Dec. 28, 2023

(65) Prior Publication Data

US 2024/0222621 A1     Jul. 4, 2024

Related U.S. Application Data

(60) Provisional application No. 63/477,634, filed on Dec. 29, 2022.

(51) Int. Cl.
H01M 4/525         (2010.01)
H01M 4/02          (2006.01)
(Continued)

(52) U.S. Cl.
CPC ......... H01M 4/525 (2013.01); H01M 4/0407 (2013.01); H01M 4/505 (2013.01); H01M 10/0562 (2013.01); H01M 2004/028 (2013.01)

(58) Field of Classification Search
CPC .... H01M 4/505; H01M 4/525; H01M 4/5835; H01M 4/0407; H01M 10/0562; H01M 2004/028
See application file for complete search history.

(56) References Cited

U.S. PATENT DOCUMENTS 6,156,435 A     12/2000  Gleason et al.
9,413,013 B2     8/2016  Morikawa et al.
(Continued)

FOREIGN PATENT DOCUMENTS

CN          102106025 A      6/2011
CN          102263263 A     11/2011
(Continued)

OTHER PUBLICATIONS

CN-109286006-A English machine translation (Year: 2024).*
(Continued)

*Primary Examiner* — Armindo Carvalho, Jr.
(74) *Attorney, Agent, or Firm* — Abel Schillinger, LLP; Adrian Lawrence

(57)          ABSTRACT

A cathode material can include a substrate including an active cathode material and a coating overlying at least a portion of the substrate. The coating material may include $CF_x$ and $M_2CO_3$, wherein M may include an alkali metal. In a particular embodiment, the coating may include MF. In another particular embodiment, M may include Li.

20 Claims, 7 Drawing Sheets

(51) Int. Cl.

| | |
|---|---|
| *H01M 4/04* | (2006.01) |
| *H01M 4/505* | (2010.01) |
| *H01M 10/0562* | (2010.01) |

(56) References Cited

U.S. PATENT DOCUMENTS

| | | | | |
|---|---|---|---|---|
| 11,258,064 | B2 | 2/2022 | Sun et al. | |
| 11,637,287 | B2 | 4/2023 | Sugimoto et al. | |
| 2011/0247204 | A1* | 10/2011 | Viavattine | H01M 10/0431 |
| | | | | 29/730 |
| 2013/0320928 | A1 | 12/2013 | Yazami et al. | |
| 2015/0325851 | A1 | 11/2015 | Hardiyanto et al. | |
| 2016/0369397 | A1 | 12/2016 | Mäntymäki et al. | |
| 2019/0379056 | A1* | 12/2019 | Chen | H01M 10/052 |
| 2020/0067079 | A1* | 2/2020 | Pan | H01M 10/0525 |
| 2020/0203704 | A1 | 6/2020 | Oakes et al. | |
| 2021/0305550 | A1 | 9/2021 | Kim et al. | |
| 2021/0320298 | A1 | 10/2021 | Dai et al. | |
| 2021/0332207 | A1 | 10/2021 | Liu et al. | |
| 2021/0336263 | A1* | 10/2021 | Wang | H01M 4/62 |
| 2022/0029154 | A1 | 1/2022 | Chang et al. | |
| 2022/0190380 | A1* | 6/2022 | Hirakawa | H01M 10/48 |
| 2023/0327226 | A1* | 10/2023 | Kim | H01M 10/54 |
| | | | | 429/49 |

FOREIGN PATENT DOCUMENTS

| | | | | | |
|---|---|---|---|---|---|
| CN | 107492645 | A | * | 12/2017 | ........ H01M 10/0525 |
| CN | 109286006 | A | * | 1/2019 | ........ H01M 10/0525 |
| CN | 110137470 | A | | 8/2019 | |
| CN | 113169371 | A | | 7/2021 | |
| CN | 115443567 | A | | 12/2022 | |
| EP | 3954673 | A1 | | 2/2022 | |
| JP | 5044060 | B2 | | 10/2012 | |
| KR | 20020091748 | A | | 12/2002 | |
| KR | 20190087373 | A | | 7/2019 | |
| KR | 20220121609 | A | | 9/2022 | |
| WO | 9742356 | A1 | | 11/1997 | |
| WO | 2019146296 | A1 | | 8/2019 | |
| WO | 2022271651 | A1 | | 12/2022 | |

OTHER PUBLICATIONS

CN-107492645-A English machine translation (Year: 2024).*

Breddemann et al., "Fluorination of Ni-Rich Lithium-Ion Battery Cathode Materials by Fluorine Gas: Chemistry, Characterization, and Electrochemical Performance in Full-cells", Batteries & Supercaps, published Mar. 29, 2021, 4, 632-645, 14 pages.

Chang et al., "Ultralong storage life of Li/MnO2 primary batteries using MnO2-(CFx)n with C-F semi-ionic bond as cathode materials", Electrochimica Acta, published Aug. 22, 2019, 9 pages.

Chen et al., "Novel ALD Chemistry Enabled Low-Temperature Synthesis of Lithium Fluoride Coatings for Durable Lithium Anodes", ACS Appl. Mater. Interfaces, 2018, 10, 32, https://doi.org/10.1021/acsami.8b04573, published Jul. 9, 2018, abstract only.

He et al., "The intrinsic behavior of lithium fluoride in solid electrolyte interphases on lithium", published Dec. 17, 2019, Applied Physical Sciences, 117(1), 73-79, 7 pages.

Hennessy et al., "Atomic Layer Deposition of Lithium Fluoride Optical Coatings for the Ultraviolet", Inorganics, 2018, 6, 46, https://doi.org/10.3390/inorganics602004, published May 4, 2018, 10 pages.

Jang et al., "Enabling a Co-Free, High-Voltage LiNi0.5Mn1.5O4 Cathode in All-Solid-State Batteries with a Halide Electrolyte", ACS Energy Lett., 2022, 7, 8, 2531-2539, https://doi.org/10.1021/acsenergylett.2c01397, published Jul. 12, 2022, abstract only.

Lim et al., "Bifunctional carbon monofluoride (CFx) coating on a separator for lithium-metal batteries with enhanced cycling stability", Journal of Electroanalytical Chemistry, published Nov. 11, 2020, 878, 6 pages.

Lin et al., "Conformal Lithium Fluoride Protection Layer on Three-Dimensional Lithium by Nonhazardous Gaseous Reagent Freon", Nano Lett., 2017, 17, 6, 3731-3737, https://doi.org/10.1021/acs.nanolett.7b01020, published May 23, 2017, abstract only.

Liu et al., "Stabilized cobalt-free lithium-rich cathode materials with an artificial lithium fluoride coating", Int J Miner Metall Mater 29, 917-924 (2022), https://doi.org/10.1007/s12613-022-2483-7, published Apr. 26, 2022, abstract only.

Liu et al., "Synergistic Effect of F- Doping and LiF Coating on Improving the High-Voltage Cycling Stability and Rate Capacity of LiNi0.5Co0.2Mn0.3O2 Cathode Materials for Lithium-Ion Batteries", ACS Appl. Mater. Interfaces, 2018, 10, 40, 34153-34162, https://doi.org/10.1021/acsami.8b10016, published Sep. 12, 2018, abstract only.

Ma et al., "In situ formed LiNi0.8Co0.1Mn0.1O2@LiF composite cathode material with high rate capability and long cycling stability for lithium-ion batteries", Ionics 26, pp. 2165-2176 (2020), https://doi.org/10.1007/s11581-019-03353-2, published Dec. 7, 2019, abstract only.

Qu et al., "Sputtering Coating of Lithium Fluoride Film on Lithium Cobalt Oxide Electrodes for Reducing the Polarization of Lithium-Ion Batteries", Nanomaterials, published Dec. 14, 2021, 12 pages.

Sun et al., "Interface-Structure-Modulated CuF2/CFx Composites for High-Performance Lithium Primary Batteries", Energy & Environmental Materials, published Apr. 16, 2022, 0, 1-9, 9 pages.

Ultramet, Chemical Vapor Deposition, https://ultramet.com/chemical-vapor-deposition/, accessed on Jan. 25, 2024, 6 pages.

Xie et al., "Fluorinating the Solid Electrolyte Interphase by Rational Molecular Design for Practical Lithium-Metal Batteries", Angewandte Chemie, vol. 61, Issue 29, https://doi.org/10.1002/anie.202204776, published May 16, 2022, abstract only.

Zhang et al., "Fluoroethylene Carbonate Additives to Render Uniform Li Deposits in Lithium Metal Batteries", Advanced Functional Materials, vol. 27, Issue 10, https://doi.org/10.1002/adfm.201605989, published Mar. 10, 2017, abstract only.

Zhang et al., "Formation of LiF Surface Layer During Direct Fluorination of High Capacity Co-Free Disordered Rock-Salt Cathodes", ACS Applied Mater Interf, 13, 32 p. 38221 (2021), https://www.osti.gov/pages/servlets/purl/1820713, 24 pages.

Zhang et al., "Formation of LiF Surface Layer During Direct Fluorination of High Capacity Co-Free Disordered Rock-Salt Cathodes—Supporting Information", ACS Applied Mater Interf, 13, 32 p. 38221 (2021), https://www.osti.gov/pages/servlets/purl/1820713, 4 pages.

Zhao et al., "Enhance performances of Co-free Li-rich cathode by eutesctic melting salt treatment", Nano Energy, vol. 92, https://doi.org/10.1016/j.nanoen.2021.106760, published 2022, abstract only.

Zhao et al., "Surface Fluorination of Reactive Battery Anode Materials for Enhanced Stability", J. Am. Chem. Soc., 2017, 139, 33, 11550-11558, https://doi.org/10.1021/jacs.7b05251, published Jul. 26, 2017, abstract only.

Sun, H. Y. et al., "Fluorocarbon film as cathode protective coating in organic light-emitting devices", Applied Physics Letters, 2006, vol. 88, Article No. 223503, pp. 1-3.

Wang, X. et al., "Fluorine doped carbon coating of LifePO4 as a cathode material for lithium ion batteries", Chemical Engineering Journal, 2020, vol. 379, Article No. 122371, pp. 1-10.

International Search Report and Written Opinion for PCT/US2023/086205, mailed May 10, 2024, 8 pages.

Chronopouos et al., "Chemistry, properties, and applications of fluorographene", Applied Materials Today 9 (2017) 60-70, published 2017, 11 pages.

* cited by examiner

CATHODE MATERIAL AND METHODS OF FORMING

CROSS-REFERENCE TO RELATED APPLICATION(S)

This application claims priority under 35 U.S.C. § 119(e) to U.S. Provisional Application No. 63/477,634, entitled "CATHODE MATERIAL AND METHODS OF FORMING," by Morgane A. S. LAURENT et al., filed Dec. 29, 2022, which is assigned to the current assignee hereof and incorporated herein by reference in its entirety.

FIELD OF THE DISCLOSURE

The following is directed to a cathode material and methods of forming the same.

DESCRIPTION OF THE RELATED ART

Solid-state lithium batteries are expected to provide higher energy densities and faster recharging times and cause fewer safety concerns compared to conventional lithium-ion batteries. Current solid electrolyte materials include oxides, halides, sulfides, fluorides, and solid polymer electrolytes. The stability of electrolyte materials may play a role in performance of solid-state lithium batteries. The industry continues to demand improved solid electrolyte and electrode materials.

BRIEF DESCRIPTION OF THE DRAWINGS

The present disclosure may be better understood, and its numerous features and advantages made apparent to those skilled in the art by referencing the accompanying drawings.

Figure 1A:
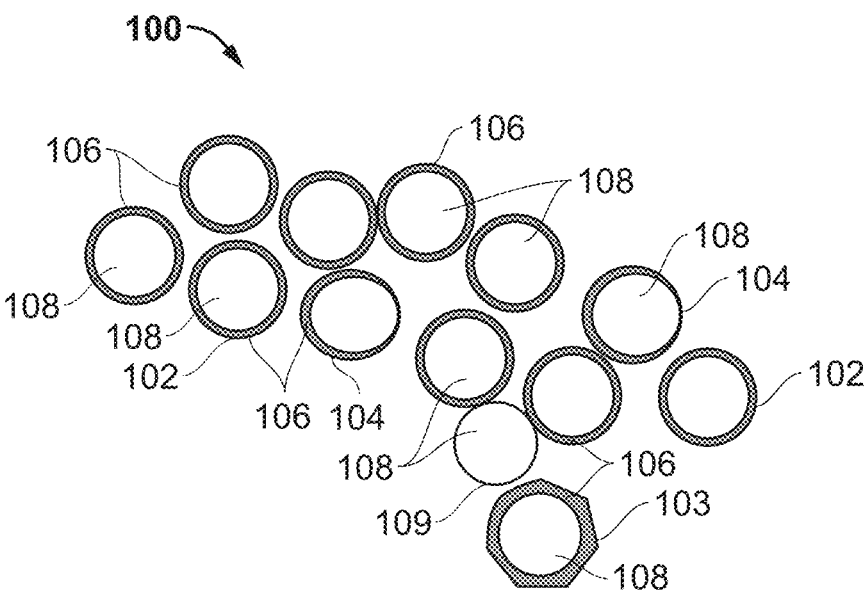
FIGS. 1A and 1B include illustrations of cathode materials according to embodiments.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one, and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to a cathode material including a substrate and a coating material overlying at least a portion of the substrate, wherein the substrate can include a cathode active material. In an embodiment, the substrate can include particles including the cathode active material. The cathode material may be a suitable component of a non-aqueous battery, such as a solid-state battery including a solid-state lithium battery, a solid-state sodium battery, or the like, or any combination thereof. In an exemplary implementation, the cathode material may be in direct contact with a solid electrolyte material, such as a solid halide-based electrolyte material or another solid electrolyte material. The cathode material may have improved ion diffusion rate, capacity retention, reversible phase transition, or any combination thereof. The cathode material may also facilitate improved stability of the solid electrolyte material and improved performance of a solid-state battery.

Further embodiments relate to methods of forming the cathode material. The methods can allow for the improved formation of the cathode material and facilitate the formation of the cathode material having improved properties.

In an embodiment, the cathode material can include a coating material including fluorinated carbon (also referred to as "$CF_x$" in this disclosure) and $M_2CO_3$, wherein M comprises an alkali metal. In an aspect, M may include Li, Na, Cs, Rb, or a combination thereof. In an example, M may include Li. In another example, M can include Na. In a further example, M may include Li and another alkali metal, such as Na, Cs, or both. In a particular example, M may consist essentially of at least one of Li and Na.

In an embodiment, the coating material can include MF. In an aspect, MF may include LiF, NaF, CsF, RbF, or a combination thereof. In an example, MF may include LiF. In another example, M can include NaF. In a further example, MF may include LiF and another alkali metal fluoride, such as NaF, CsF, or both. In a particular example, MF may consist essentially of at least one of LiF and NaF.

In an embodiment, the coating may include fluorinated carbon including stoichiometric carbon monofluoride, sub-stoichiometric carbon monofluoride, or any combination thereof. In an aspect, fluorinated carbon may include $CF_1$, $C_2F_4$, $CF_2$, $CF_3$, $CF_4$, or any combination thereof. In a particular aspect, the coating may include $CF_4$, $CF_2$, or both. In another aspect, the coating may include particular ratios between species of fluorinated carbon. XPS may be used to detect species of fluorinated carbon. In another particular aspect, the coating may include $CF_1$.

In an embodiment, the cathode material may include a particular average thickness of the coating that may facilitate improved performance and/or property of the cathode material. In an aspect, the coating may have an average thickness of less than one micron. For example, the coating may have an average thickness of at most 100 nm, such as at most 80 nm, at most 70 nm, at most 60 nm, at most 50 nm, at most 40 nm, at most 30 nm, or at most 20 nm. In another example, the coating may have an average thickness of at least 1 nm, such as at least 2 nm, at least 5 nm, at least 7 nm, at least 10 nm, at least 13 nm, at least 15 nm, at least 18 nm, or at least 20 nm. Moreover, the coating may have an average thickness in a range including any of the minimum and maximum values noted herein.

As used herein, average thickness of the coating may be determined by utilizing transmission electron microscopy to analyze a cathode material sample having a sample size statistically significant to represent the cathode material.

In an embodiment, the coating may cover at least a portion of the substrate. In an aspect, the coating may be continuous extending along at least a portion of the substrate. In another aspect, the coating may have a particular coverage over the substrate that may facilitate improved performance and/or property of the cathode material. For example, the coating may cover at least 20% of the substrate, at least 30%, at least 40%, at least 50%, or a majority of the substrate. In a further example, the coating may cover essentially the entire substrate. In another example, the coating may cover not greater than 99%, not greater than 96%, not greater than 90%, not greater than 88%, not greater than 85%, or not greater than 80% of the substrate. Moreover, in a particular example, the coating may have a coverage in a range including any of the minimum and maximum percentages noted herein.

In an embodiment, the cathode material may be in the form of powder. In another embodiment, the cathode material may be in the form of a suspension. In still another embodiment, the cathode material may include the substrate in the form of particles. In an aspect, the substrate may include a plurality of particles including a cathode active material. In another aspect, at least a portion of the particles may have a coating. For example, at least 20 wt %, at least 30 wt %, at least 40 wt %, or at least 50 wt % for a total weight of the particles may include a coating. In a particular aspect, at least a majority, such as more than 50 wt %, at least 60 wt %, at least 70 wt %, at least 80 wt %, at least 90 wt %, or at least 95 wt % for the total weight of the particles may include the coating. In a particular example, essentially all of the particles, such as at least 95 wt % or at least 98 wt % of the particles for a total weight of the particles may include the coating. More particularly, all of the particles, such as 100 wt % of the particles, may include the coating. In a further aspect, not all of the particles may include a coating. For example, not greater than 99 wt % of the particles may include the coating, such as not greater than 98 wt %, not greater than 96 wt %, not greater than 94 wt %, not greater than 92 wt %, not greater than 90 wt %, or not greater than 88 wt % of the particles for the total weight of the particles may include the coating. Moreover, the cathode material may include a content of particles having the coating, wherein the content may be in a range including any of the minimum and maximum percentages noted herein.

In a further embodiment, the cathode material may include at least 20% of particles for a total number of the particles including a coating, such as at least 30%, at least 40%, or at least 50% for a total number of the particles may include a coating. In a particular embodiment, at least a majority, such as more than 50%, at least 60%, at least 70%, at least 80%, at least 90%, or at least 95% for the total number of the particles may include the coating. In a particular example, essentially all of the particles, such as at least 95% or at least 98% of the particles for a total number of the particles may include the coating. More particularly, all of the particles may include the coating. In another embodiment, not all of the particles may include a coating. For example, not greater than 99% of the particles may include the coating, such as not greater than 98%, not greater than 96%, not greater than 94%, not greater than 92%, not greater than 90%, or not greater than 88% of the particles for the total weight of the particles may include the coating. Moreover, the cathode material may include a content of particles having the coating, wherein the content may be in a range including any of the minimum and maximum percentages noted herein. As disclosed herein, at least a total number of 200 randomly selected different particles are analyzed for determining the number % of particles having a coating.

In an embodiment, the content of particles including the coating may be determined by using energy dispersive X-ray analysis (EDX). A cathode material sample having a sample size statistically representative of the cathode material can be analyzed by EDX. The number or weight of the particles having the coating can be determined based on the EDX result, and the percentage of the particles having the coating relative to the total number or weight of the particles that are analyzed can be used as the content of the particles including the coating for the batch of the cathode material.

Referring to FIG. 1A, an exemplary cathode material 100 is illustrated. The cathode material 100 may include a plurality of particles including the substrate in the form of particles 108 and the coating 106 overlying the particles 108. The coating 106 may be in direct contact with the particles 108. In the illustrated example, the cathode material may include particles 102 including the coating 106 that may essentially cover the particles 108 entirely. The particles 102 may have a substantially uniform coating thickness. In another embodiment, the cathode material may include particles having a coating thickness variation. For example, thickness of the coating may decrease and/or increase along the surface of coated particles.

In certain instances, the cathode material 100 may include coated particles 103, wherein the coating 106 may essentially cover the particle 108 entirely and may have a variation in coating thickness.

In certain instances, the cathode material 100 may include coated particles 104, wherein a portion of the particles may be covered by the coating 106. In the embodiment illustrated in FIG. 1A, particles 104 may have a coating thickness variation along the surface of particles 108. In another embodiment, partially coated particles and/or fully coated particles may have a substantially uniform coating thickness.

In another embodiment, the cathode material may include coated particles, wherein at least some of the particles may include a substantially uniform coating thickness along the coated surface. For example, at least 20% of the total number of the coated particles may include a substantially uniform coating thickness, such as at least 30%, at least 40%, or at least 50% of the particles may include a substantially uniform coating thickness. In a particular example, a majority of the coated particles may include a coating having a substantially uniform thickness, such as at least 55%, at least 60%, at least 70%, at least 80%, or at least 90% of the coated particles may include a coating having a substantially uniform thickness. In a particular example, essentially all of the coated particles may include a coating having a substantially uniform thickness. In a further example, not greater than 98%, not greater than 95%, not greater than 92%, not greater than 90%, or not greater than 88% of the coated particles may include a substantially uniform coating thickness.

In a further instance, the cathode material 100 may include uncoated particle 109. As illustrated, the cathode material 100 may include a majority of particles including the coating 106.

In another embodiment, the cathode material 100 may include at most 50 wt % of uncoated particles for a total weight of the particles, such as less than 50 wt %, not greater than 40 wt %, not greater than 30 wt %, not greater than 20 wt %, not greater than 10 wt %, not greater than 5 wt %, not greater than 3 wt %, or not greater than 1 wt % of uncoated particles for the total weight of the particles. The content of uncoated particles may be determined by using EDX in the manner similar to embodiments described with respect to determining the content of particles including the coating.

In still another embodiment, the cathode material 100 may include at most 50% of uncoated particles for a total number of the particles, such as less than 50%, not greater than 40%, not greater than 30%, not greater than 20%, not greater than 10%, not greater than 5%, not greater than 3%, or not greater than 1% of uncoated particles for the total number of the particles. In a particular embodiment, the cathode material may be essentially free of uncoated particles.

In an embodiment, the cathode material may include particles having an average particle size. In an example, the average particle size may be sub-microns to hundreds of microns or even bigger. In another example, the average particle size may be from 1 micron to 500 microns. In still another example, the average particle size may be from 1 micron to 10 microns, such as 2 microns to 5 microns. In still another example, the cathode material may include loose particles, agglomerated particles, aggregates, or any combination thereof. A skilled artisan appreciates the cathode materials may include average particle sizes that may be suited for applications of the cathode materials.

Figure 1B:
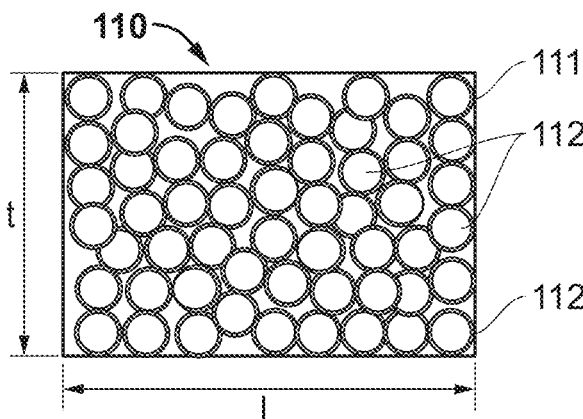

In an embodiment, the cathode material may be in a form of a sheet, a tape, a block, a film, or another shape, or any combination. Referring to FIG. 1B, a cross-sectional view of an exemplary cathode material 110 according to an embodiment is illustrated. The cathode material 110 may include a body 111 including a plurality of particles 112. The body 110 may include a length L and a thickness t. In an embodiment, the particles 112 may include any or all of the features described with respect to particles 102, 103, 109, and 104 illustrated in FIG. 1A. It is to be appreciated that the cathode material 110 may include any or all of the features described with respect to the cathode material 100 except that the cathode materials 110 and 100 may be in a different form.

In an embodiment, the cathode material may include a plurality of particles, wherein at least some of particles may have a coating coverage of at least 50% for the surface area of the particle. For example, at least 30%, such as at least 40%, at least 50%, at least 60%, at least 70%, at least 80%, at least 90%, or at least 95% of the particles for a total number of the particles may include a coating coverage of at least 50% for the surface area of the particle. In another example, all or essentially all of the particles may include a coating coverage of at least 50% for the surface area of the particle. In a further example, not greater than 95% of the particles, such as not greater than 90%, not greater than 80%, or not greater than 70% of the particles for a total number of the particles may include a coating coverage of at least 50% for the surface area of the particle. Moreover, the cathode material may include a content of particles having a coating coverage of at least 50%, wherein the content may be in a range including any of the minimum and maximum percentages noted herein.

In a further embodiment, the cathode material 100 may include a particular average coating coverage that may facilitate improved property and/or performance of the cathode material. The average coating coverage may be determined based on analysis of a cathode material sample having a sample size statistically representative of the cathode material. Transmission electron microscopy may be utilized to determine the coating coverage of each of the particles for the surface area of the particle. The average coating coverage may be the total of the coating coverage of all the analyzed particles divided by the number of particles. In an aspect, the cathode material may include an average coating coverage of at least 30%, such as at least 40%, at least 50%, at least 60%, at least 70%, at least 75%, at least 80%, at least 90%, or at least 95%. In a particular example, the cathode material may include an average coating coverage of 100%. In another aspect, the cathode material may include an average coating covering of not greater than 99%, not greater than 96%, not greater than 93%, not greater than 90%, not greater than 88%, not greater than 85%, or not greater than 80%. Moreover, the cathode material may include an average coating coverage in a range including any of the minimum and maximum percentages noted herein.

Figure 2:
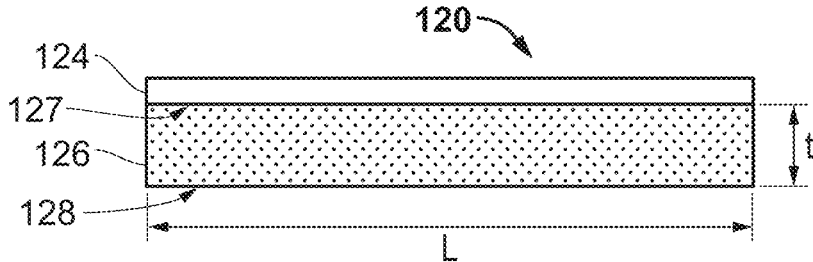
FIG. 2 includes an illustration including of a cross-sectional view of a cathode material according to an embodiment.

In an embodiment, the cathode material may include a substrate in a form of a tape, a sheet, a block, a film, or the like, or any combination thereof. The substrate may include the active cathode material. Referring to FIG. 2, a cross-sectional view of an exemplary cathode material 120 is illustrated including a substrate 126 including the active cathode material and a coating 124 overlying the substrate 126. The substrate may include a length L and a thickness t.

The substrate 126 may include a major surface 127 and another major surface 128 opposite the major surface 127. The coating 124 may overlie at least one of the major surface 127 or 128, such as the major surface 127 as illustrated. A skilled artisan can appreciate the coating 124 may overlie the major surface 128. In at least one embodiment, the cathode material 120 may include the coating 124 overlying both of the major surfaces 127 and 128 of the substrate 126.

In another embodiment, the cathode material 120 may include the coating 124 that may overlie at least a portion of the substrate 126. In a further embodiment, the coating 124 may overlie at least a portion of a major surface 127 and/or 128 of the substrate 126. In a further embodiment, the coating 124 may have a particular coverage over the substrate 126 that may facilitate improved performance and/or property of the cathode material. For example, the coating 124 may cover at least 20% of a major surface of the substrate, such as at least 30%, at least 40%, at least 50%, or a majority of a major surface of the substrate. In a further example, the coating may cover essentially an entire major surface substrate. In another example, the coating may cover not greater than 99%, not greater than 96%, not greater than 90%, not greater than 88%, not greater than 85%, or not greater than 80% of a major surface the substrate. Moreover, in a particular example, the coating 124 may have a coating coverage in a range including any of the minimum and maximum percentages noted herein.

In an embodiment, the substrate may include a coating in a form of a thin film. In a further embodiment, the cathode material may include a coating that may be relatively dense. In an aspect, the coating may have a density of at least 90% of the theoretical density, such as at least 93%, at least 95%, at least 98%, or even at least 99% of the theoretical density. In particular, the coating may have a density that is greater than a density when the coating is formed by a densification process involving calcination. In another aspect, the coating may have relatively low porosity. The porosity may be constituted by voids that may be present in the coating. For example, the coating may include a minimum amount of pores within the coating. Porosity may be distinct from uncoated area of the particle surface. For example, the cathode material may include particles that may be partially covered by the coating, wherein the coating may include a minimal amount of pores. In a particular aspect, the cathode material may include a coating including a porosity of not greater than 7 vol % for a total volume of the coating, such as not greater than 5 vol %, not greater than 3 vol %, or not greater than 1 vol %. In a particular example, the coating may be essentially free of pores. In another aspect, the cathode material may include a coating including a porosity of at least 0.1 vol %, such as at least 0.4 vol %, at least 0.7 vol %, at least 1 vol %, or at least 2 vol % for the total volume of the coating. Moreover, the cathode material may include a coating having a porosity in a range including any of the minimum and maximum percentages noted herein.

In an embodiment, the cathode material may include a coating that may have a relatively smooth surface. In an aspect, the coating may have a relatively low surface roughness. For example, the surface roughness of the coating may be lower than the surface roughness of the coating formed by a densification process involving calcination. Surface roughness may be determined by analyzing a cathode material sample having a sample size that is statistically representative of the cathode material using scanning electron microscopy, transmission electron microscopy or both.

In an embodiment, the cathode material may include a coating having a substantially uniform thickness. In another embodiment, the coating may include a thickness variation along the coated area of the substrate. In a particular embodiment, the coating may have a particular average thickness variation along the coated surface that may facilitate improved property and/or performance of the cathode material. In an example, the average thickness variation may be within ±50% of the average coating thickness, such as within ±40%, within ±30%, within ±20%, within −10%, or within ±5% of the average coating thickness.

In an embodiment, the cathode material may include a coating including a particular content of $M_2CO_3$, $CF_x$, and/or MF that may facilitate improved property and/or performance of the cathode material. In another embodiment, the coating may include a particular relative content of $M_2CO_3$, $CF_x$, and/or MF that may facilitate improved property and/or performance of the cathode material. The relative content may be determined by X-ray photoelectron spectroscopy (XPS) analysis. A skilled artisan appreciates the relative content is in comparison to the content of a certain element. In this disclosure, the relative content of $M_2CO_3$, $CF_x$, and MF is in comparison to the content of Ni as determined by XPS as follows. The full survey spectrum comprising all existing elements on the surface of the coated active cathode material may be acquired. Then the peak areas associated with each peak on the survey spectrum are extracted. The extracted peak areas are corrected by considering the sensitivity factor of each element (i.e., dividing the peak intensity by the sensitivity factor of the element), and all the peak areas are normalized with respect to Ni.

In a particular embodiment, the relative content of $M_2CO_3$ may be at least 0.4, at least 0.6, at least 0.7, at least 0.8, at least 0.9, or at least 1.0. Additionally or alternatively, the relative content of $M_2CO_3$ may be not greater than 1.5, not greater than 1.3, not greater than 1.1, not greater than 0.9, or not greater than 0.8. Moreover, the relative content of $M_2CO_3$ may be in a range including any of the minimum and maximum values noted herein.

In an embodiment, the coating may include a relative content of $CF_x$ of at least 0.05, such as at least 0.07, at least 0.09, at least 0.11, or at least 0.13. Additionally or alternatively, the relative content of $CF_x$ may be not greater than 0.42, not greater than 0.40, not greater than 0.38, not greater than 0.35, not greater than 0.32, not greater than 0.30, not greater than 0.28, not greater than 0.27, not greater than 0.25, not greater than 0.23, not greater than 0.21, not greater than 0.18, not greater than 0.15, or not greater than 0.13. Moreover, the relative content of $CF_x$ may be in a range including any of the minimum and maximum values noted herein.

In an embodiment, the coating may include a relative content of MF of at least 1.2, at least 1.4, at least 1.7, at least 1.9, at least 2.1, at least 2.3, at least 2.5, at least 2.7, at least 2.9, at least 3.0, or at least 3.2. Additionally or alternatively, the relative content of MF may be not greater than 6.4, not greater than 6.1, not greater than 5.8, not greater than 5.5, not greater than 5.2, not greater than 4.9, not greater than 4.6, not greater than 4.2, not greater than 3.9, not greater than 3.7, not greater than 3.5, not greater than 3.1, or not greater than 3.0. Moreover, the relative content of MF may be in a range including any of the minimum and maximum values noted herein.

In an embodiment, the coating may include a particular content ratio, $C_1$, of the relative content of $M_2CO_3$ to the relative content of $CF_x$ that may facilitate improved property and/or performance of the cathode material. In a further embodiment, the ratio $C_1$ may be at least 3.6, at least 3.8, at least 4.1, at least 4.5, at least 4.8, at least 5.1, at least 5.3, at least 5.7, at least 5.9, at least 6.3, at least 6.7, at least 6.9, at least 7.2, at least 7.5, at least 7.8, at least 8.1, at least 8.3, at least 8.5, or at least 8.7. Additionally or alternatively, the ratio $C_1$ may be not greater than 11.5, not greater than 11.2, not greater than 10.8, not greater than 10.5, not greater than 10.1, not greater than 9.7, not greater than 9.4, not greater than 9.1, not greater than 8.8, not greater than 8.6, or not greater than 8.3. Moreover, the ratio $C_1$ may be in a range including any of the minimum and maximum values noted herein.

In an embodiment, the coating may include a particular content ratio, $C_2$, of the relative content of MF to the relative content of $M_2CO_3$ that may facilitate improved property and/or performance of the cathode material. In a further embodiment, the ratio $C_2$ may be at least 1.2, at least 1.4, at least 1.6, at least 1.8, at least 2.1, at least 2.3, at least 2.5, at least 2.7, at least 2.9, at least 3.0, or at least 3.2. Additionally or alternatively, the ratio $C_2$ may be not greater than 6.4, not greater than 6.1, not greater than 5.8, not greater than 5.5, not greater than 5.2, not greater than 4.9, not greater than 4.6, not greater than 4.3, not greater than 4.1, not greater than 3.8, not greater than 3.5, not greater than 3.2, not greater than 3.1, or not greater than 2.9. Moreover, the ratio $C_2$ may be in a range including any of the minimum and maximum values noted herein.

In an embodiment, the coating may include a particular content ratio, $C_3$, of the relative content of MF to the relative content of $CF_x$ that may facilitate improved property and/or performance of the cathode material. In a further embodiment, the ratio $C_3$ may be not greater than 35.4, not greater than 34.1, not greater than 32.8, not greater than 31.5, not greater than 30.2, not greater than 28.9, not greater than 28.6, not greater than 27.3, not greater than 26.1, not greater than 25.8, or not greater than 24.5. Additionally or alternatively, the ratio $C_3$ may be at least 6.3, at least 7.8, at least 9.2, at least 10.5, at least 11.1, at least 12.3, at least 14.5, at least 15.2, at least 16.9, at least 18.0, at least 19.5, at least 21.5, at least 23.8, at least 24.5, at least 25.8, or at least 26.2. Moreover, the ratio $C_3$ may be in a range including any of the minimum and maximum values noted herein.

In an embodiment, the cathode material may include a particular concentration of a fluoride that may facilitate improved property and/or performance of the cathode material. In a further embodiment, the coating may include organic fluoride, such as fluorinated carbon, and inorganic fluoride, such as MF. In another embodiment, the cathode material may include a particular total concentration ($C_{TF}$) of the organic and inorganic fluorides that may facilitate improved property and/or performance of the cathode material. For example, the total concentration ($C_{TF}$) may be greater than greater than 0, such as at least 5 µg/g, at least 20 µg/g, at least 50 µg/g, at least 90 µg/g, at least 110 µg/g, at least 150 µg/g, at least 205 µg/g, at least 235 µg/g, or greater than 235 µg/g. In a particular example, the total concentration ($C_{TF}$) may be at least 236 µg/g, at least 240 µg/g, at least 260 µg/g, at least 290 µg/g, at least 310 µg/g, at least 335 µg/g, at least 355 µg/g, at least 370 µg/g, or at least 390 µg/g. In another example, the total concentration ($C_{TF}$) may be less than 805 µg/g, such as at most 800 µg/g, at most 785 µg/g, at most 770 µg/g, at most 730 µg/g, at most 695 µg/g, at most 650 µg/g, at most 601 µg/g, at most 570 µg/g, at most 515 µg/g, at most 475 µg/g, at most 435 µg/g, or at most 395 µg/g. Moreover, the total concentration may be in a range including any of the minimum and maximum values noted herein.

In another embodiment, the cathode material may include a particular concentration of the organic fluoride ($C_{OF}$) that may facilitate improved property and/or performance of the cathode material. For example, the concentration of the organic fluoride ($C_{OF}$) may be at least 0.5 µg/g, such as at least 1 µg/g, at least 2 µg/g, at least 4 µg/g, at least 6 µg/g, at least 8 µg/g, at least 10 µg/g, at least 12 µg/g, or at least 14.5 µg/g. In another example, the concentration of the organic fluoride ($C_{OF}$) may be less than 32.7 µg/g, such as at most 32 µg/g, at most 30 µg/g, at most 27 µg/g, at most 25 µg/g, at most 21 µg/g, at most 19 µg/g, at most 17 µg/g, at most 16 µg/g, at most 15 µg/g, or at most 14.5 µg/g.

Moreover, the concentration of the organic fluoride ($C_{OF}$) may be in a range including any of the minimum and maximum values noted herein.

In another embodiment, the cathode material may include a particular concentration of the inorganic fluoride ($C_{IF}$) that may facilitate improved property and/or performance of the cathode material. For example, the concentration of the inorganic fluoride ($C_{IF}$) may be greater than 0, such as at least 25 µg/g, at least 40 µg/g, at least 75 µg/g, at least 90 µg/g, at least 125 µg/g, or at least 156.5 µg/g, or at least 202.3 µg/g. In a particular example, the concentration of the inorganic fluoride ($C_{IF}$) may be greater than 202.3 µg/g, such as at least 205 µg/g, at least 210 µg/g, at least 240 µg/g, at least 280 µg/g, at least 310 µg/g, at least 335 µg/g, at least 355 µg/g, at least 370 µg/g, or at least 377.5 µg/g. In another example, the concentration of the inorganic fluoride ($C_{IF}$) may be less than 770.8 µg/g, such as at most 769 µg/g, at most 750 µg/g, at most 740 µg/g, at most 725 µg/g, at most 680 µg/g, at most 640 µg/g, at most 615 µg/g, at most 605 µg/g, at most 581 µg/g, at most 540 µg/g, at most 515 µg/g, at most 475 µg/g, at most 435 µg/g, at most 395 µg/g, at most 385 µg/g, or at most 378 µg/g. Moreover, the concentration of the inorganic fluoride ($C_{IF}$) may be in a range including any of the minimum and maximum values noted herein.

In a further embodiment, the cathode material may include a particular concentration ratio ($C_{I/O}$) of the concentration of the inorganic fluoride ($C_{IF}$) to the concentration of the organic fluoride ($C_{OF}$). In an example, the concentration ratio ($C_{I/O}$) may be greater than 22.5, such as at least 23, at least 24, at least 25, or at least 26. In another example, the concentration ratio ($C_{I/O}$) may be at most 81, at most 75, at most 70, at most 65, at most 61, at most 56, at most 52, at most 48, at most 43, at most 39, at most 34, at most 31, at most 28, or at most 26. Moreover, the concentration ratio ($C_{I/O}$) may be in a range including any of the minimum and maximum values noted herein.

In an embodiment, the substrate may include an active cathode material including an oxide. An exemplary oxide may include one or more metal element of alkali metal, 3d metal, 4d metal, 5d metal, a rare earth metal, and alkaline earth metal. In a further example, the oxide may comprise an alkali transition metal oxide. In particular examples, the alkali metal may include Li, Na, or a combination thereof. In another particular example, the oxide may comprise at least one 3d metal, such as Ni. In a particular embodiment, the active cathode material may include a lithium-doped nickel oxide material. In an example, the lithium-doped nickel oxide material may include an additional dopant. In a more particular embodiment, the active cathode material may comprise Li—Ni—Mn—Co oxide. A particular example may include $LiNi_xMn_yCo_zO_2$, wherein x>0, y≥0, z≥0, x+y+z=1, and y+z>0. In a more particular example, 0.3<X<0.8, 0.2<Y<0.3, 0.1<Z<0.4. An even more particular example may include $LiNi_{0.6}Mn_{0.2}Co_{0.2}O_2$.

Figure 3:
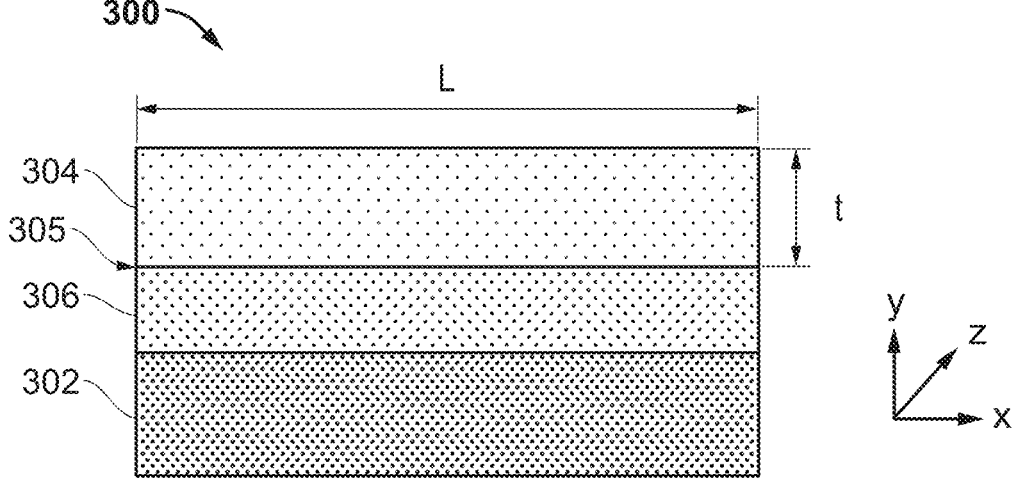
FIG. 3 includes a cross-sectional illustration of a multi-layer structure according to an embodiment.

Referring to FIG. 3, a multi-layer structure 300 of an embodiment is illustrated, including a layer 304 overlying an electrolyte layer 306 and a third layer 302 opposite the layer 304 across the electrolyte layer 306. The layer 304 may comprise the cathode material described in embodiment herein. For instance, the layer 304 may include the cathode material 100 illustrated in FIG. 1A or 110 illustrated in FIG. 1B. In another instance, the layer 304 may include the cathode material 120 illustrated in FIG. 2. The electrolyte layer 306 may include a solid electrolyte material.

The layer 304 may include a thickness t extending in the stacking direction of the multi-layer structure 300 or the y-axis, a length L extending in the x-axis, and a width extending in the z-axis. It can be appreciated, the thickness, width, and length of the other components, such as layers 306 and 302, may extend in the same direction, respectively, to the layer 304.

In an embodiment, the layer 304 may be a cathode layer. In an aspect, the cathode layer 304 may include the cathode material and optionally an additive. An exemplary additive may include a binder material, such as an organic binder, a pore former, a filler, such as a conductive filler (e.g., conductive carbon), or the like, or any combination thereof. In another embodiment, the layer 304 may be a composite layer including the cathode material and an ionic conductive material. For example, the layer 304 may include a solid electrolyte material described in embodiments herein. In a further embodiment, the layer 304 may include a plurality of layers. In a particular embodiment, the coating of the cathode material may be in direct contact with the electrolyte layer 306.

In an embodiment, the electrolyte layer may include a solid electrolyte material including a halide-based electrolyte material, a sulfide-based electrolyte material, an oxide-based electrolyte material, a hydroxyl halide, an oxyhalide, an organic electrolyte material, e.g., a polymer electrolyte, or the like, or any combination thereof.

In a particular embodiment, the cathode materials may be particularly suitable to be used with a solid electrolyte material that may be prone to degradation, such as a sulfide electrolyte material, a halide electrolyte material, or the like, or any combination thereof.

In a particular embodiment, the electrolyte layer may include a halide-based electrolyte material. In an aspect, the halide-based electrolyte material may include an anion including a halogen from the group of F, Cl, Br, and I. In a particular aspect, the halide-based electrolyte material may include at least two halogen anions. A more particular example of the halide-based electrolyte material may include at least two halogen anions selected from the group consisting of F, Cl, and Br.

In a further embodiment, the halide-based electrolyte material may be represented by $M_{3-z}(Me^{k+})_f X_{3-z+k*f}$, wherein $-3 \leq z < 3$; $2 \leq k \leq 6$; $0 \leq f \leq 1$; M may include an alkali metal element; and X may include a halogen. Me may include a divalent metal element, a trivalent metal element, a tetravalent metal element, a pentavalent metal element, a hexavalent metal element, or any combination thereof.

In a particular embodiment, the halide-based electrolyte material may be represented by $Li_{3-x-f}M_f RE_{1-y}Me^k_y (Cl_{1-u-p-q}Br_u F_p I_q)_{6-x+y*(k-3)}$, wherein $-1 <= x <= 1$; $0 <= y <= 1$; $0 <= u < 1$; $0 <= p <= 1/3$; $0 <= q <= 1/6$; $0 < (u+p+q) < 1$; $0 <= f <= 0.3$. In a more particular embodiment, the halide material may be represented by $Li_{3-x}RE_{1-y}Me^k_y (Cl_{1-u-p-q}Br_u F_p I_q)_{6-x+y*(k-3)}$, wherein $0.08 <= u <= 0.67$. M may be at least one alkali metal element other than Li. RE may be a rare-earth element. Me be at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE; and k may be a valence of Me.

In a further embodiment, the halide electrolyte material may be represented by $Li_a M_a Me_b Me'_b X_c X'_{c'}$ and have a particular crystallography phase transition, wherein X and X' may represent different halogens, and Me' may represent another Me. In an aspect, the crystallography phase transition may be within the stoichiometry range of $(b/(b+b'))_t * 0.84 < b/(b+b') < (b/(b+b'))_t * 1.16$, wherein $(b/(b+b'))_t$ may correspond to the crystallography phase transition on the crystallography phase diagram at a temperature from 20° C. to 25° C. In a further aspect, the crystallography phase transition may be within the stoichiometry range of $(c/(c+c'))_t * 0.84 < c/(c+c') < (c/(c+c'))_t * 1.16$, wherein $(c/(c+c'))_t$ may correspond to the crystallography phase transition on the crystallography phase diagram at the temperature from 20° C. to 25° C. In still another aspect, the crystallography phase transition may be within the stoichiometry range of $(a/(a+a'))_t * 0.84 < a/(a+a') < (a/(a+a'))_t * 1.16$, wherein $(a/(a+a'))_t$ may correspond to the crystallography phase transition on the crystallography phase diagram at the temperature from 20° C. to 25° C. In a further embodiment, the halide electrolyte material may include $NH_4 X$, wherein X may be a halogen of Cl, Br, F, or I, and $NH_4+$ may substitute a fraction of alkali metal.

A particular example of the solid electrolyte material may include $Li_{3-a}Na_a Y(Br_x Cl_y)_6$, wherein $0 \leq a \leq 0.33$ and $x+y=1$. In a more particular example, $x \leq y$. An even more particular example of the solid electrolyte material may include $Li_3 YBr_6$, $Li_3 YCl_6$, $Li_3 Y(Cl_{0.67}Br_{0.33})_6$, $Li_3 Y(Cl_{0.79}Br_{0.21})_6$, $Li_3 Y(Br_{0.35}Cl_{0.65})_6$, $Li_3 Y(Cl_{0.8}Br_{0.2})_6$, $Li_3 Y(Cl_{0.19}Br_{0.81})_6$, $Li_3(Y_{0.95}Yb_{0.05})_1(Cl_{0.83}Br_{0.17})_6$, $Li_3(Y_{0.95}In_{0.05})(Cl_{0.9}Br_{0.1})_6$, $Li_{2.95}(Y_{0.95}Zr_{0.05})(Cl_{0.9}Br_{0.1})_6$, $Li_3(Y_{0.85}In_{0.15})Cl_6$, $(Li_{0.95}Na_{0.045})_3 Y_1 Cl_6$, $Li_3 Y(Cl_{0.41}Br_{0.59})_6$, $Li_3 Y(Cl_{0.62}Br_{0.38})_6$, $Li_3 Y(Cl_{0.67}Br_{0.33})_6$, $Li_3 Y(Cl_{0.79}Br_{0.21})_6$, or any combination thereof.

In a further embodiment, the halide material may comprise a relatively low content of impurity phases including water insoluble impurity phase, a binary halide phase, ternary halide phase, or any combination thereof. For example, the halide material may comprise for a total weight of the halide material a total content of one or more water insoluble impurity phase of less than 0.11 wt %, such as not greater than 0.1 wt %, not greater than 0.09 wt %, not greater than 0.08 wt %, not greater than 0.07 wt %, not greater than 0.05 wt %, not greater than 0.04 wt %, not greater than 0.03 wt %, not greater than 0.01 wt %, not greater than 0.008 wt %, not greater than 0.006 wt %, not greater than 0.004 wt %, or not greater than 0.003 wt % for a total weight of the halide material. In instances, a majority of the water insoluble impurity phase may include one or more phase of rare earth oxyhalide, oxyhalide of Me, a rare-earth oxide, an oxide of Me, or any combination thereof. In another instance, the water insoluble impurity phase may consist essentially of one or more phases of rare earth oxyhalide, oxyhalide of Me, a rare-earth oxide, an oxide of Me, or any combination thereof.

In a further example, the halide material may comprise for a total weight of the halide material, a total content of binary halide phase of not greater than 10 wt %, such as not greater than 9 wt %, not greater than 8 wt %, not greater than 7 wt %, not greater than 6 wt %, not greater than 5 wt %, not greater than 3 wt %, not greater than 2 wt %, not greater than 1 wt %, or not greater than 0.5 wt %. The binary halide may include a cation of a metal element selected from the group consisting of Li, M, Me, and RE.

In a further example, the halide material may comprise for a total weight of the halide material, not greater than 6 wt % of a ternary halide phase, such as not greater than 5 wt %, not greater than 3 wt %, not greater than 2 wt %, not greater than 1 wt %, or not greater than 0.5 wt % of the total content of ternary halide phase for the total weight of the halide material. An exemplary ternary halide may include two metal cations and one halide anion, such as alkali metal-rare-earth metal halide, or one metal element and two halide anions, or both. An exemplary metal cation can include a cation of Li, M, RE, and/or Me metal elements. In a particular embodiment, the halide material can be essentially free of binary halide phase, ternary halide phase, oxynitride phase, and oxyhalide phase. In a more particular embodiment, the halide material may consist essentially of a single phase.

In a further embodiment, the solid electrolyte material may include a single crystalline or polycrystalline material. In another embodiment, the solid electrolyte material may include an oriented polycrystalline halide electrolyte material, wherein grains of the polycrystalline halide electrolyte material may be oriented in a particular crystalline direction that may facilitate improved ionic conductivity. For instance, the grains may be oriented such that ionic conductivity in the extending direction of the thickness, t, of the electrolyte layer 306 may be greater than the length, L, direction or the width direction of the electrolyte layer or another crystalline direction.

In an embodiment, the coating of the cathode material may be in direct contact with the solid electrolyte material. For example, the coating 106 and 124 illustrated in FIGS. 1A and 2, respectively, may be in direct contact with the electrolyte layer 306 of FIG. 3.

Referring to FIG. 3, an interface 305 between the layers 304 and 306 is illustrated. In an embodiment, at least a portion of the interface 305 may be defined by the coating of the cathode material and the solid electrolyte material. In a particular embodiment, the multi-layer structure 300 may include the interface 305 including a certain contact area defined by the coating of the cathode material and the solid electrolyte material that may facilitate improved performance and/or property of the multi-layer structure. In an aspect, the contact area may be at least 50% of the entire interface 305, such as at least 55%, at least 60%, at least 70%, at least 80%, at least 90%, or at least 95% of the entire interface. In a particular embodiment, the entire interface 305 may be defined by the coating and the solid electrolyte material. In a further aspect, the contact area may be at most 99% of the entire interface 305, such as at most 95%, at most 93%, at most 90%, at most 87%, or at most 85% for the entire interface 305. Moreover, the contact area defined by the coating and the solid electrolyte material may be in a range including any of the minimum and maximum percentages noted herein.

In an embodiment, the third layer 302 may be an anolyte, an anode, another electrolyte layer, or another component of a solid-state battery, or any combination thereof. A skilled artisan appreciates that a multi-layer structure contemplated in this disclosure may not necessarily include three layers, and that in instances, the multi-layer structure 200 may include the cathode layer 304 overlying an electrolyte layer 306 without the third layer 302 as illustrated.

The cathode material described in embodiments herein have improved property comparing to cathode material having the same active cathode material without the coating. For example, the cathode material may have improved stability, reduced reactivity with a solid electrolyte material, improved reversible phase transition, wettability, processability, Li-ion diffusion, or any combination thereof. In particular embodiment, the cathode material may be a suitable component of a Li and/or Na solid-state battery and may facilitate improved performance of the solid-state batteries. In more particular embodiment, the cathode material may be in direct contact with a halide solid electrolyte material and may notably improve stability of the solid electrolyte material and overall performance of the solid-state batteries. Such improvement may be reflected by improved charge and recharge capability, specific capability over charge-recharge cycles, reduced degradation of the electrolyte material, or any combination thereof.

In an embodiment, the cathode material, such as the cathode materials 100, 110, and 120 illustrated in FIG. 1A, 1B, or 2, respectively, may include a particular $\sigma$-(Warburg coefficient) that may facilitate improved property and performance of the cathode material. In an aspect, the cathode material may include $\sigma$-(Warburg coefficient) of not greater than 2940 $\Omega s^{-1}$, such as not greater than 2800 $\Omega s^{-1}$, not greater than 2500 $\Omega s^{-1}$, not greater than 2200 $\Omega s^{-1}$, not greater than 2000 $\Omega s^{-1}$, not greater than 1800 $\Omega s^{-1}$, not greater than 1600 $\Omega s^{-1}$, not greater than 1490 $\Omega s^{-1}$, or not greater than 1350 $\Omega s^{-1}$. In an aspect, the cathode material may include $\sigma$-(Warburg coefficient) of at least 500 $\Omega s^{-1}$, at least 700 $\Omega s^{-1}$, at least 850 $\Omega s^{-1}$, at least 1000 $\Omega s^{-1}$, at least 1150 $\Omega s^{-1}$, at least 1300 $\Omega s^{-1}$, or at least 1400 $\Omega s^{-1}$. Moreover, the cathode material may include $\sigma$-(Warburg coefficient) in a range including any of the minimum and maximum values noted herein.

$\sigma$-(Warburg coefficient) may be calculated as follows.

A cell battery can be used for the test. The cell battery can include a pressed cathode pellet made of 60 wt % of the cathode material and 40 wt % of $Li_3Y(Cl_{0.8}Br_{0.2})_6$ and 0.5 wt % of conductive carbon relative to the total of the cathode material and $Li_3Y(Cl_{0.8}Br_{0.2})_6$, a Li foil as anode, and a pressed pellet of an electrolyte of $Li_3Y(Cl_{0.8}Br_{0.2})_6$.

The Li+ diffusions of the cathode is calculated using the slope of the inclined lines at the low frequency, such as 0.1 hz-1 hz, in the electrochemical impedance spectroscopy spectrum and the following equations:

$$Z'_{re} = R_e + R_{ct} + \sigma_w \omega^{-1/2}$$

Dion=$R^2T^2/2n^4F^4A^2C^2_{ion}\sigma^2$, where, $Z'_{re}$ refers to Warbrug impedance (impedance at low frequencies), $R_e$ is electrolyte resistance, $R_{ct}$ is charge transfer resistance, $\sigma_w$ is Warbrug coefficient, $\omega$ is angular frequency, R is ideal gas constant (8.314 $Jmol^{-1}$ $K^{-1}$), T is temperature (K), n is number of electrons transferred per mol, F is Faraday constant (96500 C $mol^{-1}$), A is surface area of the electrode ($cm^2$), and $C^{ion}$ is molar concentration of $Li^+$ (mol $m^{-3}$). Warbrug coefficient ($\sigma_w$) can be obtained from the slope of $Z'_{re}$ against. Briefly turning to FIGS. 6B-6C, by plotting the $Z_{re}$ values from the highlighted region in FIG. 6B vs. $1/w^{1/2}$ (angular frequency), $\sigma_w$ can be obtained from the slope of the linear graph (FIG. 6C).

The cathode material of embodiments herein may have improved $\sigma$-(Warburg coefficient) compared to a cathode material having the same active cathode material but coating formed by a process involving calcination. Coatings formed by a process involving calcination may result in thicker coating and thus tend to have greater $\sigma$-(Warburg coefficient) compared to the coating of embodiments herein.

Figure 5A:
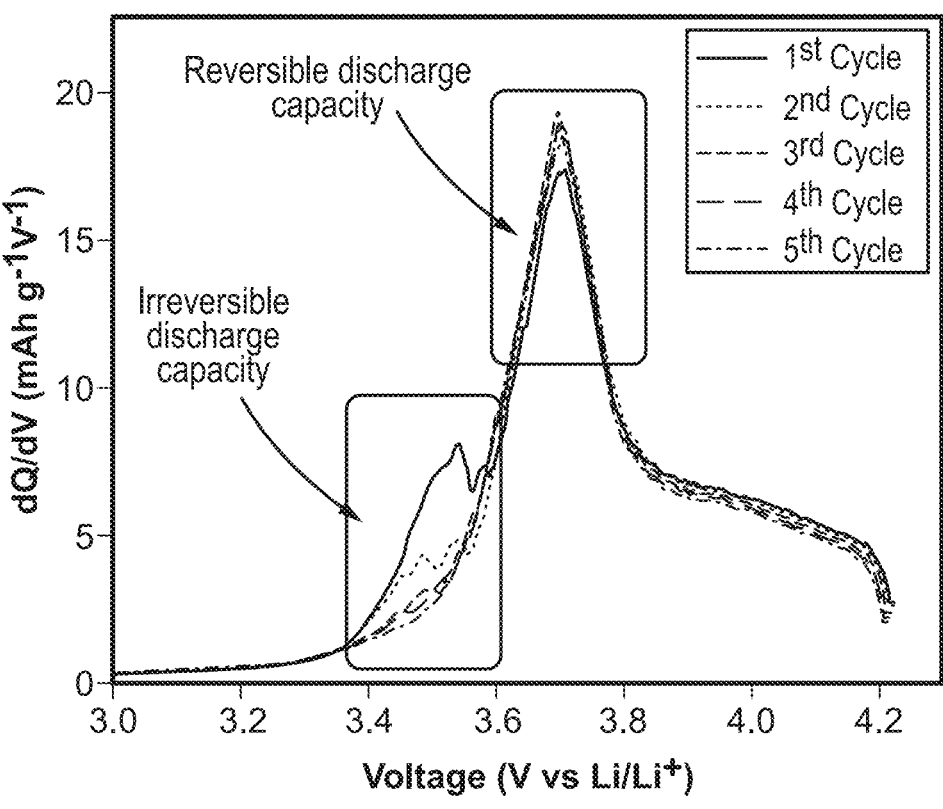
FIG. 5A includes a plot of differential capacity vs. voltage of a sample.
Figure 5B:
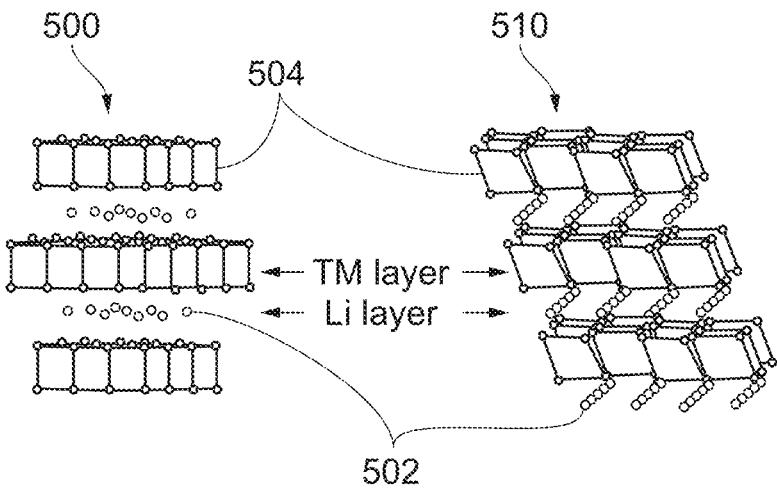
FIG. 5B includes an illustration of crystalline structures of a cathode material.
Figure 5C:
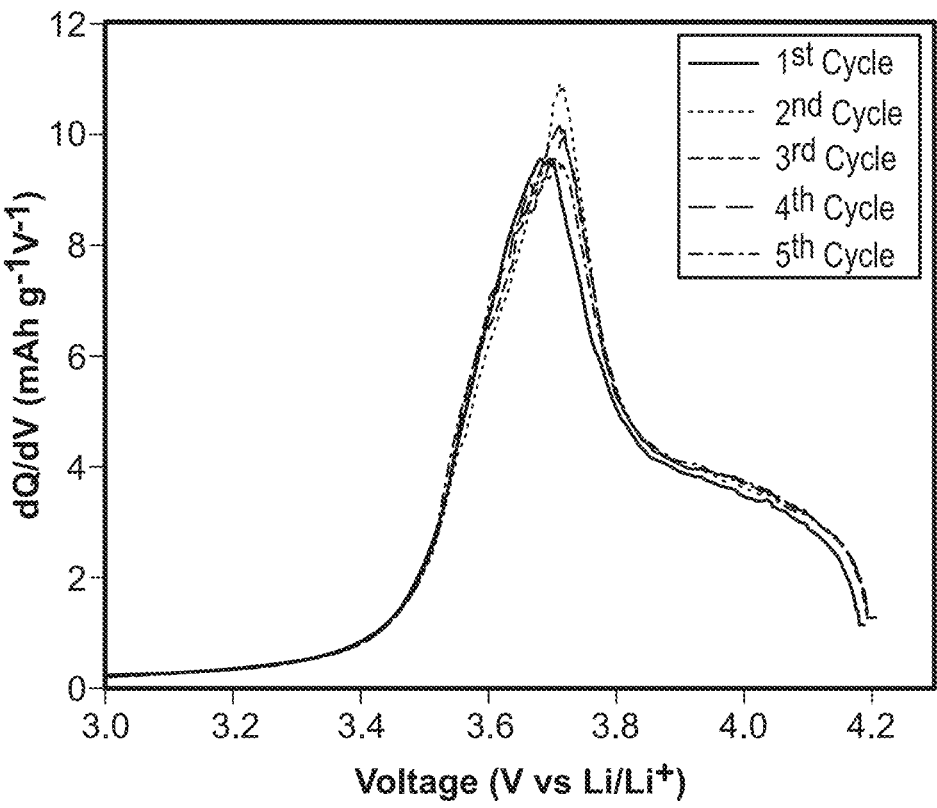
FIG. 5C includes a plot of differential capacity vs. voltage of a sample according to an embodiment.

In an embodiment, the cathode material may comprise a reversible discharge capacity under a voltage differential. In an aspect, the cathode material may be capable of shifting between a first crystalline structure and a second crystalline structure under a voltage differential, which may be indicative of reversible discharge capacity of the cathode material. Referring to FIGS. 5B and 5C, a representative cathode material may be capable of shifting between the hexagonal crystalline structure 500 to the monoclinic crystalline structure 510 and may be capable of retaining the capability to shift between the two crystalline structures 500 and 510 in the first charge-discharge cycle and one or more additional charge-discharge cycles. Both crystalline structures include TM layers 504 and Li layers 502. In a particular aspect, the cathode material may be configured to retain similar capability of shifting between the crystalline structures in the 1st charge-discharge cycle and in one or more additional charge-discharge cycles. FIG. 5C includes an illustration of the differential capacity analysis of a representative cathode material Si. As illustrated, the cathode material Si may be capable of retaining the reversible discharge capacity over at least 1, at least 2, at least 3, at least 4, or at least 5 cycles.

In a further embodiment, the cathode material may comprise a particular reversible discharge capacity under a voltage differential that may facilitate improved property and/or performance of the cathode material. In a further embodiment, the cathode material may comprise a particular coulombic efficiency that may facilitate improved property and/or performance of the cathode material. Coulombic efficiency may be indicative of reversible discharge capacity of the cathode material. The coulombic efficiency may be defined as the measured discharge capacity of cycle n, $C_{dis(n)}$ over the preceding measured charge capacity, $C_{Ch(n)}$. A skilled artisan appreciates for an ideal reversible discharge capacity, the coulombic efficiency should be around 100; and when some irreversible discharge happens, the coulombic efficiency may get reduced.

In an embodiment, the cathode material may comprise a coulombic efficiency of at least 70% for at least 1 charge-recharge cycle, at least 75%, at least 78%, at least 80%, at least 85%, at least 88%, or at least 90% for at least 1 charge-recharge cycles. In a particular example, the coulombic efficiency may be near 100% for at least 1 charge-recharge cycles, such as at least 93%, at least 95%, at least 97%, or at least 99%. In a particular aspect, the coulombic efficiency may be approximately 100% for at least 1 charge-recharge cycles. In a further aspect, the cathode material may include a coulombic efficiency of at least 70% for at least 2 charge-recharge cycles, at least 3 charge-recharge cycles, at least 4 charge-recharge cycles, or at least 5 charge-recharge cycles. In a further aspect, the cathode material may include a coulombic efficiency of at least 80% for at least 1 charge-recharge cycles, at least 2 charge-recharge cycles, at least 3 charge-recharge cycles, at least 4 charge-recharge cycles, or at least 5 charge-recharge cycles. In a further aspect, the cathode material may include a coulombic efficiency of at least 90% for at least 1 charge-discharge cycles, at least 2 charge-discharge cycles, at least 3 charge-discharge cycles, at least 4 charge-discharge cycles, or at least 5 charge-discharge cycles.

In a further embodiment, the cathode material may facilitate improved stability of the electrolyte. Referring to FIG. 5A, a cathode material CS2 having the same active cathode material as Si but without coating is tested in the differential capacity analysis. Smaller peaks between the voltages 3.4V to 3.6V may be observed, which may indicate irreversible discharge capacity of the cathode material and degradation of the electrolyte, regardless reversible discharge capacity demonstrated by peaks between 3.5V and 3.9V.

Figure 4:
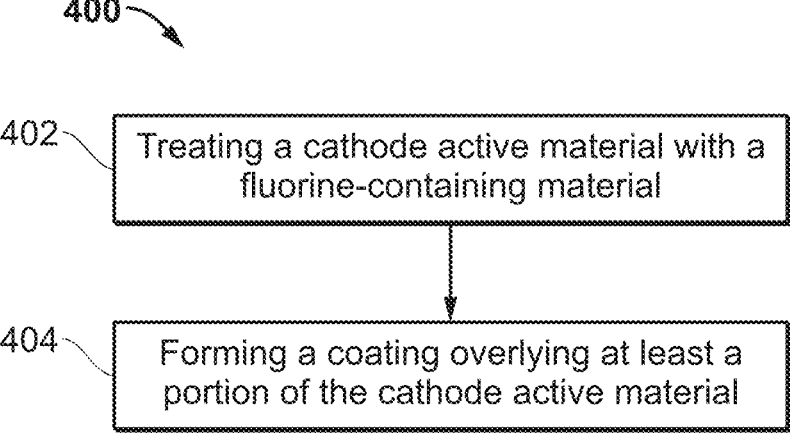
FIG. 4 includes an illustration of a process according to an embodiment.

FIG. 4 includes an illustration of a process 400 of forming the cathode material. The process 400 may include treating an active cathode material with a fluorine-containing material. In an embodiment, the fluorine-containing material may comprise an organic material, an inorganic material, or any combination thereof. In a particular embodiment, the process 400 may include treating an active cathode material with an organic material including a fluorine-containing material. An exemplary organic material may include fluorocarbon. An example of fluorocarbon may include hydrofluoroolefin, chlorofluorocarbon, hydrofluorocarbon, or fluorocarbon compounds, or any combination thereof. Another fluorine-containing material may include $F_2$. In a further example, a combination of two or more fluorine-containing materials may be utilized in the process 400.

In an embodiment, treating the active cathode material with a fluorine-containing material may be performed at a relatively low temperature. For example, the temperature may be below 120° C., such as not greater than 90° C., not greater than 75° C., not greater than 60° C., not greater than 50° C., not greater than 40° C., not greater than 35° C., not greater than 30° C., not greater than 28° C., or not greater than 25° C. In another example, the temperature may be at least 15° C., at least 18° C., at least 20° C., at least 22° C., or at least 25° C. Moreover, the temperature may be in a range including any of the minimum and maximum values noted herein. In a particular embodiment, treating the active cathode material with a fluorine-containing material may be performed at a temperature in a range from at least 15° C. to not greater than 50° C. or in a range from at least 18° C. to not greater than 35° C.

In a particular embodiment, the process 400 may be performed at a dry condition. In an aspect, materials that may come into contact with the active cathode material may be dry materials. For example, the materials may be solid, gaseous, or any combination thereof. In a further example, the process 400 may not involve a material including a liquid phase.

In an embodiment, treating the active cathode material may be performed for at least 2 min to not greater than 60 min, at least 5 min to not greater than 40 min, at least 8 min to not greater than 30 min, or at least 10 min to not greater than 26 min.

The process may continue to the block 404, forming a coating overlying at least a portion of the active cathode material. In an embodiment, forming the cathode material may include a chemical reaction between the fluorine-containing material and the active cathode material. In a particular aspect, the reaction may include fluorination of the active cathode material. In a further aspect, the reaction may facilitate deposition of the coating overlying at least a portion of the active cathode material.

In an embodiment, the process 400 may include a chemical vapor deposition process to form the coating overlying the cathode active material. In a further embodiment, the process 400 may include using plasma to treat the active cathode material with a fluorine-containing material. In a particular example, radio frequency plasma may be utilized with controlled gas pressure. For instance, the gas pressure may be controlled within a range of 0.1 to 1 mbar. In another particular example, the plasma may be low-temperature plasma. In an example, the plasma may have a temperature not greater than 100° C. In a particular example, the plasma may be less than 80 degrees, not greater than 70 degrees, not greater than 60 degrees, or not greater than 50 degrees. In a further example, the plasma may be excited by a frequency from 100 Hz to 1 Ghz. In a particular embodiment, a plasma enhanced chemical vapor deposition process may be used to form the cathode material including the coating overlying the cathode active material. In another embodiment, the process 400 may include utilizing gas treatment.

In an exemplary implementation, the process of forming the cathode material may be performed at room temperature (i.e., 22 to 25° C.). An active cathode material may be placed in a container and moved to a reaction chamber. Plasma may be utilized to treat the active cathode material with hydro-fluoroolefin for 5 to 20 min to form the coated active cathode material. In particular, the plasma may be low temperature, such as less than 80° C. In a more particular example, the plasma may include electrons having a higher energy (i.e. temperature) than ions and neutral gas species. The out-of-equilibrium state of the plasma may facilitate the reaction for forming the coating. In another particular example, the plasma may be applied at a low gas pressure, such as 0.1-1 mbar, to facilitate the out-of-equilibrium state and low temperature of the plasma.

In another exemplary implementation, gaseous treatment using $F_2$ may be performed. In particular, the treatment may be performed at room temperature to up to 150° C. The active cathode material may be exposed to $F_2$ gas between 0.03 and 3 bar for 10 minutes to 6 hours to form the coating.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A cathode material, comprising a substrate comprising an active cathode material, wherein at least a portion of the substrate is overlaid with a coating material comprising $CF_x$ and $M_2CO_3$, wherein M comprises an alkali metal.

Embodiment 2. The cathode material of embodiment 1, wherein M includes Li, Na, or a combination thereof.

Embodiment 3. The cathode material of embodiment 1 or 2, wherein the coating material further comprises MF.

Embodiment 4. The cathode material of any one of embodiments 1 to 3, wherein M comprises Li.

Embodiment 5. The cathode material of any one of embodiments 1 to 4, wherein the cathode active material comprises an oxide including one or more metal element of alkali metal, 3d metal, 4d metal, 5d metal, a rare earth metal, and alkaline earth metal.

Embodiment 6. The cathode material of any one of embodiments 1 to 5, wherein the cathode active material comprises alkali transition metal oxide.

Embodiment 7. The cathode material of embodiment 6, wherein the cathode active material comprises Li, Na, or a combination thereof.

Embodiment 8. The cathode material of embodiment 6 or 7, wherein the oxide comprises at least one 3d metal including Ni.

Embodiment 9. The cathode material of embodiment 8, wherein the oxide comprises a Li—Ni—Mn oxide optionally doped with another 3d metal.

Embodiment 10. The cathode material of any one of embodiments 1 to 9, wherein the cathode active material comprises Li—Ni—Mn—Co oxide.

Embodiment 11. The cathode material of any one of embodiments 1 to 10, wherein the substrate comprises particles comprising the cathode active material.

Embodiment 12. The cathode material of any one of embodiments 1 to 11, wherein the coating material is in a form of a thin film overlying at least a majority of the substrate.

Embodiment 13. The cathode material of any one of embodiments 1 to 12, wherein the substrate is in a form of a tape, a sheet, a film, a block, or any combination thereof.

Embodiment 14. The cathode material of any one of embodiments 1 to 13, wherein the cathode material comprises $\sigma$-(Warburg coefficient) of not greater than 2940 $\Omega s^{-1}$, not greater than 2800 $\Omega s^{-1}$, not greater than 2500 $\Omega s^{-1}$, not greater than 2200 $\Omega s^{-1}$, not greater than 2000 $\Omega s^{-1}$, not greater than 1800 $\Omega s^{-1}$, not greater than 1600 $\Omega s^{-1}$, not greater than 1490 $\Omega s^{-1}$, or not greater than 1350 $\Omega s^{-1}$.

Embodiment 15. The cathode material of any one of embodiments 1 to 14, wherein the cathode material comprises $\sigma$-(Warburg coefficient) of at least 500 $\Omega s^{-1}$, at least 700 $\Omega s^{-1}$, at least 850 $\Omega s^{-1}$, at least 1000 $\Omega s^{-1}$, at least 1150 $\Omega s^{-1}$, at least 1300 $\Omega s^{-1}$, or at least 1400 $\Omega s^{-1}$.

Embodiment 16. The cathode material of any one of embodiments 1 to 15, comprising a content ratio $M_2CO_3$ to of $CF_x$, $C_1$, of at least 3.6, at least 3.8, at least 4.1, at least 4.5, at least 4.8, at least 5.1, at least 5.3, at least 5.7, at least 5.9, at least 6.3, at least 6.7, at least 6.9, at least 7.2, at least 7.5, at least 7.8, at least 8.1, at least 8.3, at least 8.5, or at least 8.7.

Embodiment 17. The cathode material of any one of embodiments 1 to 16, comprising a content ratio of $M_2CO_3$ to $CF_x$, $C_1$, of not greater than 11.5, not greater than 11.2, not greater than 10.8, not greater than 10.5, not greater than 10.1, not greater than 9.7, not greater than 9.4, not greater than 9.1, not greater than 8.8, not greater than 8.6, or not greater than 8.3.

Embodiment 18. The cathode material of any one of embodiments 1 to 17, comprising a relative content of $M_2CO_3$ of at least 0.4, at least 0.6, at least 0.7, at least 0.8, at least 0.9, or at least 1.0.

Embodiment 19. The cathode material of any one of embodiments 1 to 18, comprising a relative content of $M_2CO_3$ of not greater than 1.5, not greater than 1.3, not greater than 1.1, not greater than 0.9, or not greater than 0.8.

Embodiment 20. The cathode material of any one of embodiments 1 to 19, comprising a relative content $CF_x$ of at least 0.05, at least 0.07, at least 0.09, at least 0.11, or at least 0.13.

Embodiment 21. The cathode material of any one of embodiments 1 to 20, comprising a relative content $CF_x$ of not greater than 0.42, not greater than 0.40, not greater than 0.38, not greater than 0.35, not greater than 0.32, not greater than 0.30, not greater than 0.28, not greater than 0.27, not greater than 0.25, not greater than 0.23, not greater than 0.21, not greater than 0.18, not greater than 0.15, or not greater than 0.13.

Embodiment 22. The cathode material of any one of embodiments 1 to 21, comprising a content ratio MF to $M_2CO_3$, $C_2$, of at least 1.2, at least 1.4, at least 1.6, at least 1.8, at least 2.1, at least 2.3, at least 2.5, at least 2.7, at least 2.9, at least 3.0, or at least 3.2.

Embodiment 23. The cathode material of any one of embodiments 1 to 22, comprising a content ratio of MF to $M_2CO_3$, $C_2$, of not greater than 6.4, not greater than 6.1, not greater than 5.8, not greater than 5.5, not greater than 5.2, not greater than 4.9, not greater than 4.6, not greater than 4.3, not greater than 4.1, not greater than 3.8, not greater than 3.5, not greater than 3.2, not greater than 3.1, or not greater than 2.9.

Embodiment 24. The cathode material of any one of embodiments 1 to 23, comprising a content ratio of MF to $CF_x$, $C_3$, of at least 6.3, at least 7.8, at least 9.2, at least 10.5, at least 11.1, at least 12.3, at least 14.5, at least 15.2, at least 16.9, at least 18.0, at least 19.5, at least 21.5, at least 23.8, at least 24.5, at least 25.8, or at least 26.2.

Embodiment 25. The cathode material of any one of embodiments 1 to 24, comprising a content ratio of MF to $CF_x$, $C_3$, of not greater than 35.4, not greater than 34.1, not greater than 32.8, not greater than 31.5, not greater than 30.2, not greater than 28.9, not greater than 28.6, not greater than 27.3, not greater than 26.1, not greater than 25.8, or not greater than 24.5.

Embodiment 26. The cathode material of any one of embodiments 1 to 25, comprising a relative content of MF of at least 1.2, at least 1.4, at least 1.7, at least 1.9, at least 2.1, at least 2.3, at least 2.5, at least 2.7, at least 2.9, at least 3.0, or at least 3.2.

Embodiment 27. The cathode material of any one of embodiments 1 to 26, comprising a relative content of MF of not greater than 6.4, not greater than 6.1, not greater than 5.8, not greater than 5.5, not greater than 5.2, not greater than 4.9, not greater than 4.6, not greater than 4.2, not greater than 3.9, not greater than 3.7, not greater than 3.5, not greater than 3.1, or not greater than 3.0.

Embodiment 28. A multi-layer structure, comprising a cathode layer overlying an electrolyte layer, wherein the cathode layer comprising the cathode material of any one of embodiments 1 to 27.

Embodiment 29. The multi-layer structure of embodiment 28, wherein the cathode layer abuts the electrolyte layer, wherein the coating material is in direct contact with the electrolyte layer.

Embodiment 30. The multi-layer structure of embodiment 28 or 29, wherein the electrolyte layer comprises a solid electrolyte material, wherein the solid electrolyte material includes a halide material.

Embodiment 31. A material, comprising the cathode material of any one of embodiments 1 to 27 and a solid electrolyte material including a halide material.

Embodiment 32. The multi-layer structure or the material of any one of embodiments 30 to 31, wherein the halide material comprises a halide anion selected from the group consisting of F, Cl, Br, and I and represented by $Li_{3-x-f}M_fRE_{1-y}Me^k{}_y(Cl_{1-u-p-q}Br_uF_pI_q)_{6-x+y*(k-3)}$, wherein:

$$-1 <= x <= 1;$$
$$0 <= y <= 1;$$
$$0 <= u < 1;$$
$$0 <= p <= 1/3;$$
$$0 <= q <= 1/6;$$
$$0 < (u + p + q) < 1;$$
$$0 <= f <= 0.3;$$

M is at least one alkali metal element other than Li;
RE is a rare-earth element;
k is a valence of Me; and
Me is at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE.

Embodiment 33. The multi-layer structure or the material of any one of embodiments 28 to 32, wherein the electrolyte material includes a halide material including at least two halide anions selected from the group consisting of F, Cl, Br, and I.

Embodiment 34. The multi-layer structure or the material of any one of embodiments 30 to 33, wherein the halide material comprises for a total weight of the halide material:
a total content of one or more water insoluble impurity phase of less than 0.11 wt %;

a total content of binary halide phase of not greater than 10 wt %;
not greater than 6 wt % of a ternary halide phase; or
any combination thereof.

Embodiment 35. The multi-layer structure or the material of any one of embodiments 30 to 34, wherein the halide material is represented by $Li_{3-x}RE_{1-y}Me^k{}_y(Cl_{1-u-p-q}Br_uF_pI_q)_{6-x+y*(k-3)}$, wherein $0.08 <= u <= 0.67$.

Embodiment 36. The multi-layer structure or the material of any one of embodiments 30 to 35, wherein the halide material is represented by $Li_aM_aMe_bMe'_bX_cX'_{c'}$, wherein the halide material has a crystallography phase transition within the stoichiometry range of:
$(b/(b+b'))_t*0.84 < b/(b+b') < (b/(b+b'))_t*1.16$, wherein $(b/(b+b'))_t$ corresponds to the crystallography phase transition on the crystallography phase diagram at a temperature from 20° C. to 25° C.;
$(c/(c+c'))_t*0.84 < c/(c+c') < (c/(c+c'))_t*1.16$, wherein $(c/(c+c'))_t$ corresponds to the crystallography phase transition on the crystallography phase diagram at the temperature from 20° C. to 25° C.; or
$(a/(a+a'))_t*0.84 < a/(a+a') < (a/(a+a'))_t*1.16$, wherein $(a/(a+a'))_t$ corresponds to the crystallography phase transition on the crystallography phase diagram at the temperature from 20° C. to 25° C.

Embodiment 37. The multi-layer structure or the material of any one of embodiments 1 to 36, wherein the cathode material is capable of shifting between hexagonal crystalline structure and monoclinic crystalline structure under a voltage differential.

Embodiment 38. The multi-layer structure or the material of any one of embodiments 1 to 37, wherein the cathode material comprises reversible discharge capacity under a voltage differential, wherein the cathode material comprises a coulombic efficiency of at least 70%, at least 75%, at least 78%, at least 80%, at least 85%, at least 88%, at least 90%, near 100%, or 100%.

Embodiment 39. A method, comprising treating a cathode active material with an organic material including a fluorine-containing material at a temperature below 120° C.

Embodiment 40. The method of embodiment 39, wherein treating the cathode active material is performed in a dry condition.

Embodiment 41. The method of embodiment 39 or 40, wherein the fluorine-containing material comprises an organic material, an inorganic material, or any combination thereof.

Embodiment 42. The method of any one of embodiments 39 to 41, wherein the fluorine-containing material comprises fluorocarbon.

Embodiment 43. The method of any one of embodiments 39 to 42, wherein the fluorine-containing material comprises hydrofluoroolefin, chlorofluorocarbon, hydrofluorocarbon, or fluorocarbon compounds, or any combination thereof.

Embodiment 44. The method of any one of embodiments 39 to 41, wherein the fluorine-containing material comprises $F_2$.

Embodiment 45. The method of any one of embodiments 39 to 44, comprising using plasma to treat the cathode active material.

Embodiment 46. The method of embodiment 45, wherein the plasma is excited by a frequency from 100 Hz to 1 Ghz.

Embodiment 47. The method of embodiment 45 or 46, wherein the plasma is applied at a gas pressure of at least 0.1 mbar and at most 1 mbar.

Embodiment 48. The method of any one of embodiments 39 to 47 wherein treating the cathode active material is performed for at least 2 min to not greater than 60 min, at least 5 min to not greater than 40 min, at least 8 min to not greater than 30 min, or at least 10 min to not greater than 26 min.

Embodiment 49. The method of any one of embodiments 39 to 48, wherein treating the cathode active material is performed at a temperature of not greater than 90° C., not greater than 75° C., not greater than 60° C., not greater than 50° C., not greater than 40° C., not greater than 30° C., or not greater than 28° C.

Embodiment 50. The method of any one of embodiments 39 to 49, wherein treating the cathode active material is performed at a temperature of at least 15° C., at least 20° C., or at least 22° C.

Embodiment 51. The method of any one of embodiments 39 to 50, wherein treating the cathode active material comprises a chemical vapor deposition process.

Embodiment 52. The method of any one of embodiments 39 to 51, wherein treating the cathode active material comprises a plasma enhanced chemical vapor deposition process.

EXAMPLE

Example 1

Active cathode material NMC622 is fluorinated to form coated NMC622 by using hydrofluoroolefin and plasma enhanced chemical vapor deposition (PE-CVD) in accordance with embodiments herein. Uncoated NMC622 and coated NMC622 was pressed into pellets together with $Li_3Y(Cl_{0.65}Br_{0.35})_6$ and conductive carbon, and used as cathodes respectively, in cell batteries including an anode of lithium foil and an electrolyte of a pressed pellet of $Li_3Y$ $(Cl_{0.65}Br_{0.35})_6$. The cell battery 1 includes uncoated NMC622. The cell battery 2 includes coated NMC622. XPS is utilized to confirm the coated NMC622 including the coating including $CF_x$, LiF, and $Li_2CO_3$; and the uncoated NMC622 does not include species including fluorine. The cathodes include 60 wt % of the respective cathode material, 40 wt % of $Li_3Y(Cl_{0.65}Br_{0.35})_6$ and 0.5 wt % of conductive carbon for the total weight of the cathode material and $Li_3Y(Cl_{0.65}Br_{0.35})_6$.

Specific capacity of the battery unit cells 1 and 2 was tested under the voltage from 3V to 4.2V (versus Li/Li⁺). Summarized data of the battery unit cells 1 and 2 is included in Tables 1 and 2, respectively.

TABLE 1

| (Battery unit cell 1 including uncoated NMC622) | | | |
| --- | --- | --- | --- |
| Cycle | Max Charge (mAh/g) | Max Discharge (mAh/g) | CE (%) |
| 1 | 166.66 | 114.48 | 68.89% |
| 2 | 109.28 | 107.24 | 98.14% |
| 3 | 104.05 | 102.87 | 98.86% |

TABLE 2

| (Battery unit cell 2 including coated NMC622) | | | |
| --- | --- | --- | --- |
| Cycle | Max Charge (mAh/g) | Max Discharge (mAh/g) | CE (%) |
| 1 | 174.96 | 150.05 | 86% |
| 2 | 152.41 | 148.41 | 97% |
| 3 | 150.47 | 147.60 | 98% |

Battery unit cell 2 demonstrated improved maximum charge and maximum discharge capacity for all the charge-discharge cycles and improved coulombic efficiency (CE %) compared to battery unit cell 1 at cycle 1. Low coulombic efficiency of the cathode material of cell battery 1 indicates degradation of electrolyte during lithiation and delithiation and irreversible discharge happened. Higher coulombic efficiency of the coated cathode material of cell battery 2 indicated improved reversible discharge capacity and significantly reduced electrolyte degradation of the coated cathode material.

Example 2

Active cathode material NMC622 is treated with hydrofluoroolefin (HFOs) to form coated NMC622 by using plasma enhanced chemical vapor deposition (PE-CVD) in accordance with embodiments herein. The time for plasma treatment is varied to form different coated NMC622 samples. Coated NMC622 Sample S3 is formed by plasma treatment for 5 minutes. Coated NMC622 Sample S4 is formed by plasma treatment for 10 minutes. Coated NMC622 Sample S5 is formed by plasma treatment for 20 minutes. Similar to Example 1, XPS is utilized to confirm the coated NMC622 samples including the coating including $CF_1$, LiF, and $Li_2CO_3$.

Uncoated NMC622 and all the coated NMC622 samples were used to form cathode in the manner similar to Example 1 and used as cathodes respectively, in cell batteries including an anode of lithium foil and an electrolyte of a pressed pellet of $Li_3Y(Cl_{0.65}Br_{0.35})_6$. The cell battery 3 includes coated NMC622 S3. The cell battery 4 includes coated NMC622 S4. The cell battery 5 includes coated NMC622 S5. The cell battery 6 is formed using uncoated NMC622. The cathodes include 60 wt % of the respective cathode material, 40 wt % of $Li_3Y(Cl_{0.65}Br_{0.35})_6$ and 0.5 wt % of conductive carbon for the total weight of the cathode material and $Li_3Y(Cl_{0.65}Br_{0.35})_6$.

Specific capacity of battery unit cells was tested and illustrated in FIG. 5A (battery unit cell 6) and FIG. 5C (battery unit cell 4). It can be observed that degradation of electrolyte, suggested by irreversible discharge capacity illustrated in FIG. 5A, is suppressed by the coated Sample 6, given the absence of smaller peaks at 3.4V to 3.6V in FIG. 5C. The smaller peaks at 3.4V to 3.6V as illustrated in FIG. 5A are indicative of irreversible discharge capacity and electrolyte degradation.

Figure 5D:
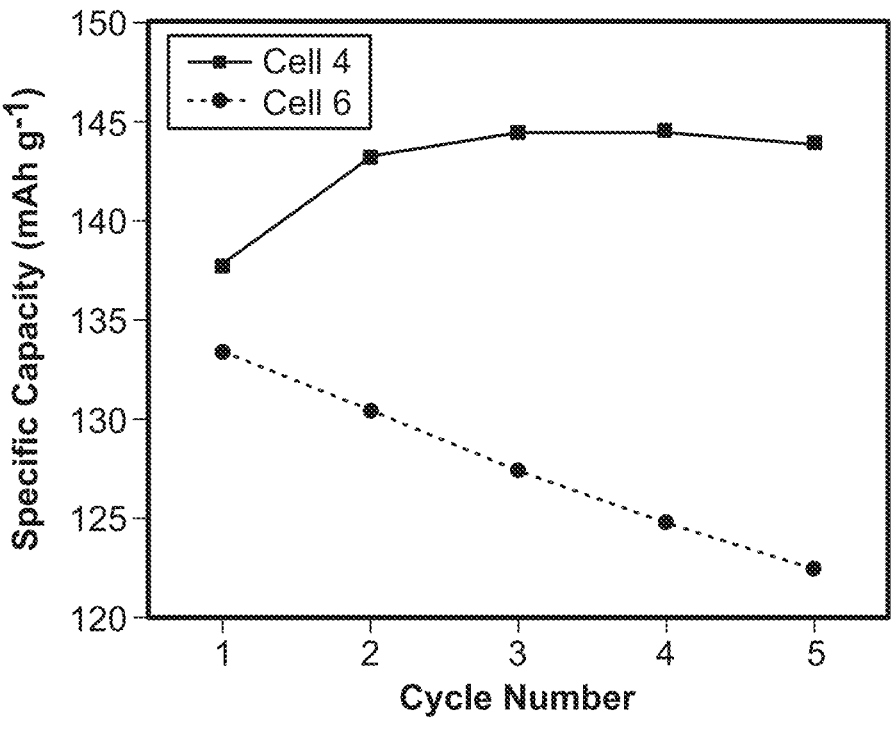
FIGS. 5D and 6A include plots of specific capacity vs. cycle number of samples.

Differential capacity analysis was performed on battery unit cells for up to 5 charge-discharge cycles and summarized in FIG. 5D. As illustrated in FIG. 5D, battery unit cell 4 demonstrated improved initial capacity (cycle 1) and improved specific capacity with increased cycle number compared to battery unit cell 6. The data further suggests capacity degradation of battery unit cell 6 and improved capacity retention of unit cell 4 with increased cycle number.

Figure 6A:
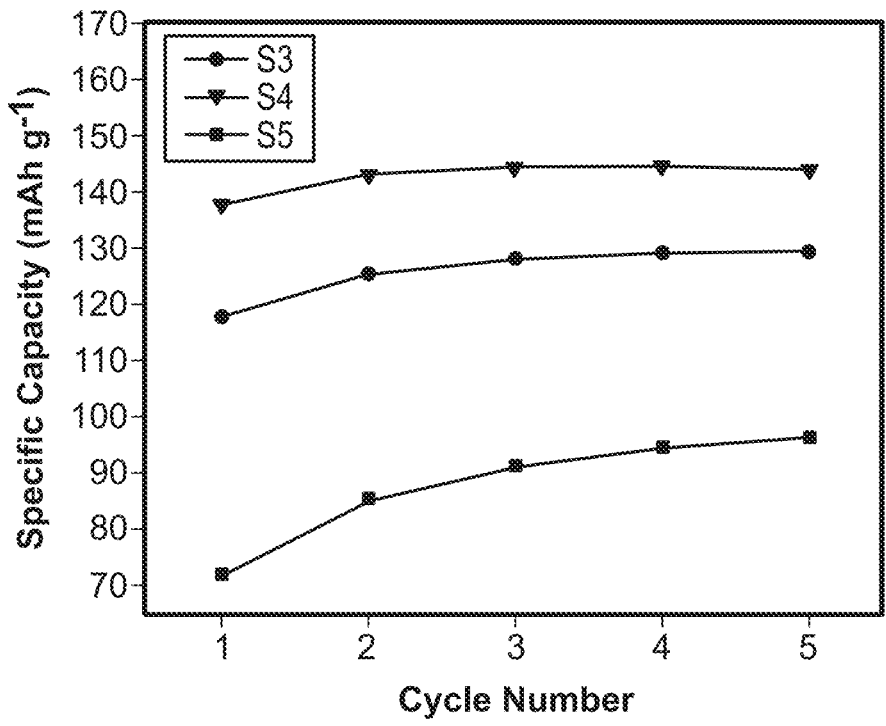

FIG. 6A includes a plot of specific capacity vs. cycle number of battery unit cells 3-5. It can be observed battery unit cells 3-5 all demonstrated improved specific capacity and capacity retention over the tested cycles. Unit cell 4 may have further improved specific capacity compared to unit cells 3 and 5; and unit cell 3 may have improved specific capacity over 5. Unit cell 5 does not demonstrate improvement in specific capacity but has improved capacity retention over the tested cycles compared to unit cell 6 (not illustrated).

Figure 6B:
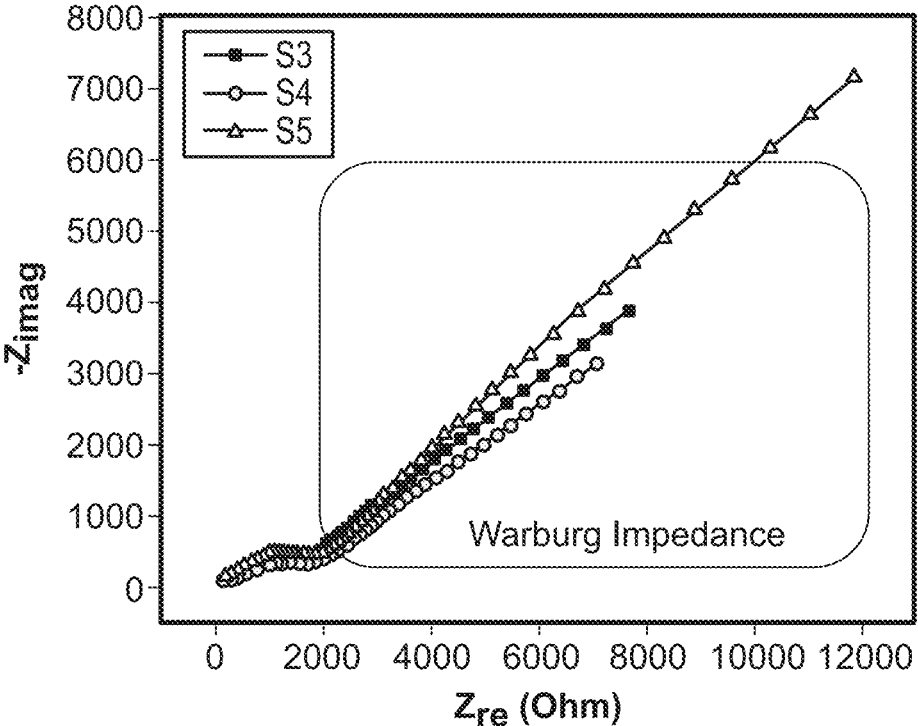
FIG. 6B includes a plot of $-Z_{imag}$ vs. $Z_{re}$ of samples according to embodiments.
Figure 6C:
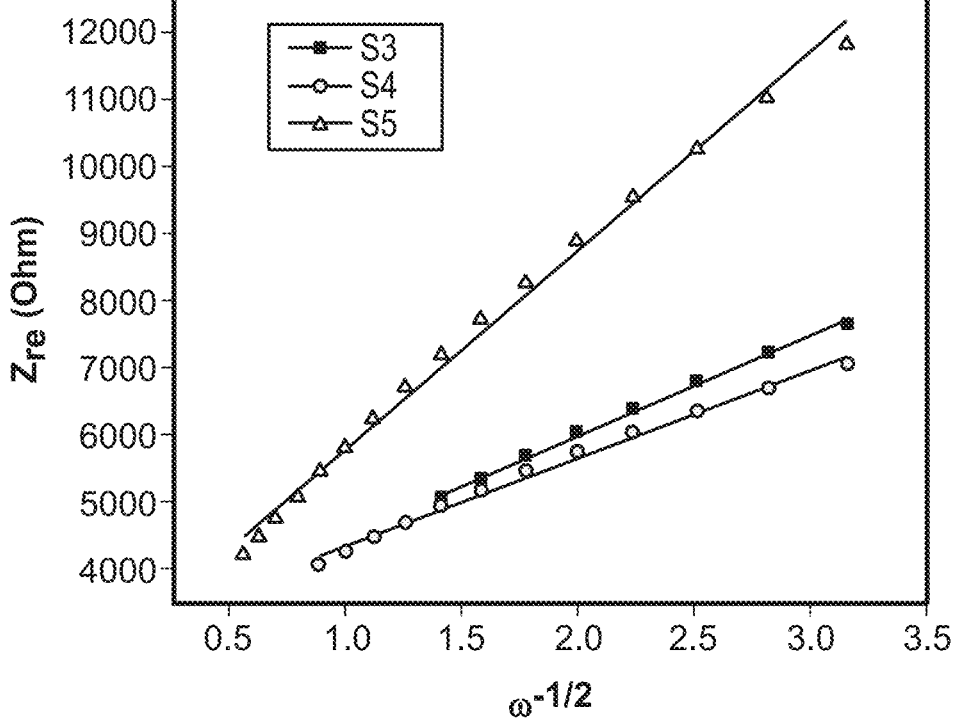
FIG. 6C includes a plot of $Z_{re}$ vs. $\omega^{-1/2}$ of samples according to embodiments.

FIG. 6B includes a plot of $-Z_{Imag}$ vs. $Z_{re}$ of battery unit cells 3-5 using linear frequency. As illustrated, the cathode material S4 has higher ion diffusion Warburg impedance than the cathode material S3, which has higher Warburg impedance than the cathode material S4. The Zre values in the highlighted region of FIG. 6B are extracted plotted versus $\omega^{-1/2}$ a plot of $Z_{re}$ vs. $\omega^{-1/2}$ illustrated in FIG. 6C. The data suggests the cathode material S5 may have the lowest $Li^+$ ion diffusion rate compared to the cathode materials S3 and S4 and the cathode material S4 may have higher $Li^+$ ion diffusion rate than the cathode material S3.

σ-(Warburg coefficient) for the cathode materials S3-5 is calculated according to embodiments herein and included in Table 3 below.

TABLE 3

| Cathode | σ-(Warburg coefficient) ($\Omega$ $s^{-1}$) |
|---|---|
| S3 | 1493 |
| S4 | 1313 |
| S5 | 2943 |

Relative contents of $CF_x$, LiF, and $Li_2CO_3$ of the cathode material S3-5 are tested by running XPS on a sample having a sample size statistically representative of the samples S3-5 as described in embodiments herein. The relative contents (relative to the content of Ni) are included in Table 4 below. Fluoride, fluorinated carbon and LiF, is not detected in uncoated NMC622 samples using high-resolution XPS spectra of F Is.

Concentrations of organic and inorganic fluoride of Samples S3-S5 are evaluated and determined based on the respective ratio of the concentration of organic fluoride (fluorinated carbon) to inorganic fluoride (LiF) obtained by using high-resolution XPS spectra of F is and the total concentration of organic and inorganic fluorides obtained by ion chromatography analysis. The organic fluoride has the binding energy peak at 689 eV and the inorganic fluoride has the binding energy peak between 681-682 eV. The concentrations are included in Table 5. The total concentration is the weight of all the fluorides relative to the weight of the sample; and the concentrations of organic and inorganic fluorides are the respective weight relative to the weight of the sample.

TABLE 4

| Sample | $CF_x$ | LiF | $Li_2CO_3$ | $Li_2CO_3/$ $CF_x$ |
|---|---|---|---|---|
| S3 | 0.264 | 1.637 | 1.470 | 5.57 |
| S4 | 0.111 | 2.866 | 0.944 | 8.504 |
| S5 | 0.105 | 2.358 | 0.367 | 3.495 |

TABLE 5

| Sample | Total Fluoride (μg/g) | Organic fluoride (μg/g) | Inorganic fluoride (μg/g) | Organic/ Total Fluoride (%) | Inorganic / Organic ratio |
|---|---|---|---|---|---|
| S3 | 235 | 32.7 | 202.3 | 13.9 | 6.2 |
| S4 | 392 | 14.5 | 377.5 | 3.7 | 26.0 |
| S5 | 805 | 34.2 | 770.8 | 4.2 | 22.5 |

Example 3

A set of the cathode material of Sample S4 of Example 2 is heated at 500° C. to remove carbon species and form Sample S9. Sample S9 is analyzed using high-resolution XPS spectra of F is and confirmed that fluorinated carbon is not detected. A battery unit cell 9 is formed in the manner similar as described in Example 2 except the cathode is formed using Sample S9.

Figure 7:
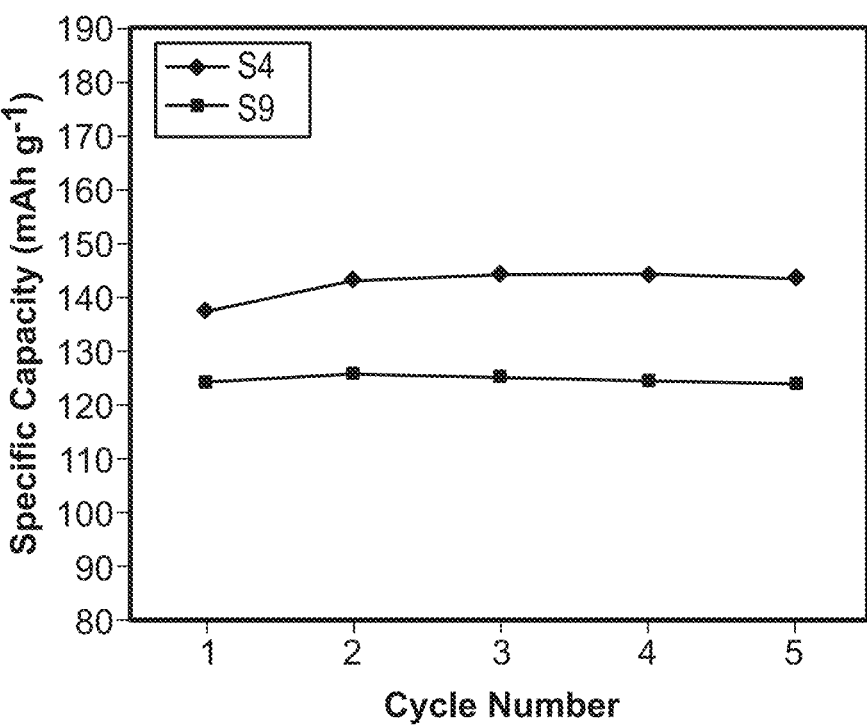
FIG. 7 includes a plot of specific capacity vs. cycle number of samples.

FIG. 7 includes a plot of specific capacity vs. cycle number of battery unit cells 4 and 9. It can be observed battery unit cell 9 has lower specific capacity compared to battery unit cell 4, which may suggest fluorinated carbon may facilitate improvement in battery cell performance.

Example 4

Active cathode material NMC811 ($LiNi_{0.8}Mn_{0.1}Co_{0.1}O_2$) is fluorinated to form coated NMC811 by using hydrofluoroolefin and plasma enhanced chemical vapor deposition (PE-CVD) in accordance with embodiments herein. Uncoated NMC811 and coated NMC811 was pressed into pellets together with $Li_3Y(Cl_{0.65}Br_{0.35})_6$ and conductive carbon, and used as cathodes respectively, in cell batteries including an anode of lithium foil and an electrolyte of a pressed pellet of $Li_3Y(Cl_{0.65}Br_{0.35})_6$. The cell battery Sample S10 includes uncoated NMC811. The cell battery S11 includes coated NMC811. The cathodes include 60 wt % of the respective cathode material, 40 wt % of $Li_3Y$ $(Cl_{0.65}Br_{0.35})_6$ and 0.5 wt % of conductive carbon for the total weight of the cathode material and $Li_3Y(Cl_{0.65}Br_{0.35})_6$.

Figure 8:
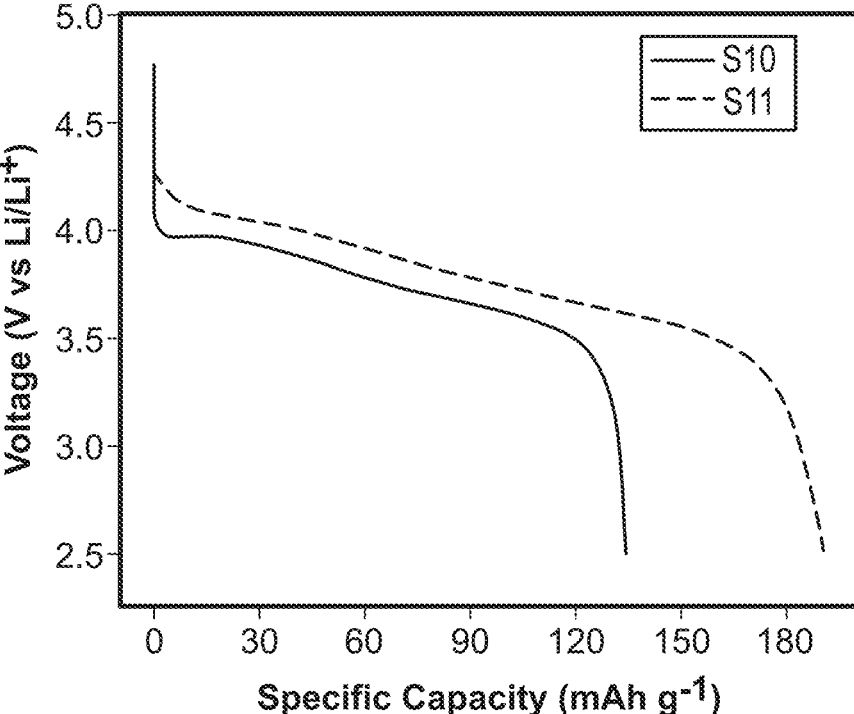
FIG. 8 includes a plot of specific capacity vs. voltages of samples.

FIG. 8 includes a plot of specific capacity vs. voltage of battery unit cell Samples S10 and S11. Sample S11 demonstrates a superior stability of specific capacity over the tested voltages than Sample S10.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Further, references to values stated in ranges include each and every value within that range. Additionally, or in the alternative, in certain nonlimiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A cathode material, comprising a substrate comprising an active cathode material, wherein at least a portion of the substrate is overlaid with a coating material comprising $CF_x$ and $M_2CO_3$, wherein M comprises an alkali metal including Li, Na, or a combination thereof, wherein a content ratio of $M_2CO_3$ to $CF_x$ is at least 3.6 and not greater than 11.5.

2. The cathode material of claim 1, wherein the active cathode material comprises alkali transition metal oxide.

3. The cathode material of claim 1, wherein the coating material further comprises MF.

4. The cathode material of claim 3, wherein M comprises Li.

5. The cathode material of claim 3, wherein the active cathode material comprises at least one 3d metal including Ni and comprises Li, Na, or a combination thereof.

6. The cathode material of claim 3, wherein the active cathode material comprises a Li—Ni—Mn oxide optionally doped with another 3d metal.

7. The cathode material of claim 1, wherein the substrate comprises particles comprising the active cathode material.

8. The cathode material of claim 1, wherein the coating material is in a form of a thin film overlying at least a majority of the substrate, wherein the substrate is in a form of a tape, a sheet, a film, a block, or any combination thereof.

9. A cathode material, comprising a substrate comprising an active cathode material, wherein at least a portion of the substrate is overlaid with a coating material comprising fluorinated carbon and $M_2CO_3$, wherein M comprises an alkali metal including Li, Na, or a combination thereof, wherein the fluorinated carbon comprises $CF_1$, wherein the coating comprises MF, and wherein a total concentration of fluorides including the fluorinated carbon and MF is less than 805 µg/g relative to a weight of the active cathode material, and wherein a content ratio of $M_2CO_3$ to the fluorinated carbon is at least 3.6 and not greater than 11.5.

10. The cathode material of claim 9, wherein a concentration of an inorganic fluoride including MF is greater than 202.3 µg/g.

11. The cathode material of claim 1, comprising a total concentration of fluorides including fluorinated carbon and MF of less than 805 µg/g relative to a weight of the active cathode material.

12. The cathode material of claim 1, comprising a concentration of an inorganic fluoride including MF of greater than 202.3 µg/g.

13. A multi-layer structure, comprising a cathode layer overlying an electrolyte layer, wherein the cathode layer comprising the cathode material of claim 1.

14. The multi-layer structure of claim 13, wherein at least a portion of the coating material is in direct contact with the electrolyte layer.

15. The multi-layer structure of claim 14, wherein the electrolyte layer comprises a solid electrolyte material, wherein the solid electrolyte material includes a halide-based material.

16. The multi-layer structure of claim 15, wherein the halide-based material is represented by $Li_{3-x-f}M_fRE_{1-y}Me^k_y$ $(Cl_{1-u-p-q}Br_uF_pI_q)_{6-x+y*(k-3)}$, wherein:

$$-1 \leq x \leq 1;$$
$$0 \leq y \leq 1;$$
$$0 \leq u < 1;$$
$$0 \leq p \leq 1/3;$$
$$0 \leq q \leq 1/6;$$
$$0 < (u + p + q) < 1;$$
$$0 \leq f \leq 0.3;$$
$$2 \leq k \leq 6;$$

M is at least one alkali metal element other than Li;
RE is a rare-earth element;
k is a valence of Me; and
Me is at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE.

17. The multi-layer structure of claim 16, wherein the halide-based material comprises at least two halogens.

18. A material, comprising the cathode material of claim 1 and a solid electrolyte material including a halide-based material represented by $Li_{3-x-f}M_fRE_{1-y}Me^k_y$ $(Cl_{1-u-p-q}Br_uF_pI_q)_{6-x+y*(k-3)}$, wherein:

$$-1 \leq x \leq 1;$$
$$0 \leq y \leq 1;$$
$$0 \leq u < 1;$$
$$0 \leq p \leq 1/3;$$
$$0 \leq q \leq 1/6;$$
$$0 < (u + p + q) < 1;$$
$$0 \leq f \leq 0.3;$$
$$2 \leq k \leq 6;$$

M is at least one alkali metal element other than Li;
RE is a rare-earth element;
k is a valence of Me; and
Me is at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE.

19. A method, comprising treating an active cathode material with an organic material including a fluorine-containing material at a temperature below 120° C.; and forming a coating material overlying at least a portion of the active cathode material, wherein the coating comprises $CF_x$ and $M_2CO_3$, wherein M comprises an alkali metal including Li, Na, or a combination thereof, wherein a content ratio of $M_2CO_3$ to $CF_x$ is at least 3.6 and not greater than 11.5.

20. The method of claim 19, wherein the fluorine-containing material comprises hydrofluoroolefin, chlorofluoro-carbon, hydrofluorocarbon, or fluorocarbon compounds, or any combination thereof.

* * * * *